US008696017B2

(12) United States Patent
Wright

(10) Patent No.: US 8,696,017 B2
(45) Date of Patent: Apr. 15, 2014

(54) CHAIR WITH A HEIGHT-ADJUSTABLE SEAT

(75) Inventor: Donald W. Wright, Duncan (CA)

(73) Assignee: Wright HI/LO Solutions Ltd., Qualicum Beach, BC (CA)

( * ) Notice: Subject to any disclaimer, the term of this patent is extended or adjusted under 35 U.S.C. 154(b) by 33 days.

(21) Appl. No.: 13/511,996

(22) PCT Filed: Nov. 26, 2010

(86) PCT No.: PCT/CA2010/001885
§ 371 (c)(1),
(2), (4) Date: May 24, 2012

(87) PCT Pub. No.: WO2011/063524
PCT Pub. Date: Jun. 3, 2011

(65) Prior Publication Data

US 2012/0241234 A1 Sep. 27, 2012

Related U.S. Application Data

(60) Provisional application No. 61/264,686, filed on Nov. 26, 2009.

(51) Int. Cl.
*B62B 3/02* (2006.01)

(52) U.S. Cl.
USPC .......................... 280/647; 280/657; 280/47.38

(58) Field of Classification Search
USPC ................. 280/638, 639, 642, 647, 650, 657, 280/47.34, 47.38, 47.41; 182/141, 148; 187/243, 244; 414/921
See application file for complete search history.

(56) References Cited

U.S. PATENT DOCUMENTS

| | | | | |
|---|---|---|---|---|
| 2,339,007 | A * | 1/1944 | Gahm | 297/5 |
| 4,669,943 | A * | 6/1987 | Zamotin | 414/343 |
| 4,862,997 | A * | 9/1989 | Eberle | 182/148 |
| 5,060,960 | A * | 10/1991 | Branscumb et al. | 280/250.1 |
| 5,112,076 | A * | 5/1992 | Wilson | 280/657 |
| 5,201,377 | A * | 4/1993 | Wilson | 180/6.5 |
| 6,142,568 | A | 11/2000 | Abelbeck et al. | |
| 6,273,443 | B1 * | 8/2001 | Fleigle | 280/304.1 |
| 7,055,840 | B1 | 6/2006 | Kelso | |
| 7,090,241 | B2 | 8/2006 | Silva | |
| 7,219,912 | B2 | 5/2007 | Meyer | |
| 7,222,868 | B2 | 5/2007 | Norman et al. | |
| 7,273,255 | B2 | 9/2007 | Nylander et al. | |
| 7,296,960 | B2 | 11/2007 | Strong | |
| 7,306,251 | B2 | 12/2007 | Bright et al. | |
| 2005/0236812 | A1 | 10/2005 | Firth | |

OTHER PUBLICATIONS

Extract printed Sep. 30, 2009 from Instinct Mobility Inc.'s website: http://www.useyourinstinct.com/about.php.
Extract printed Nov. 18, 2010 from Instinct Mobility Inc.'s website: http://www.useyourinstinct.com/.

* cited by examiner

*Primary Examiner* — John Walters
(74) *Attorney, Agent, or Firm* — Tomlinson Rust McKinstry Grable

(57) ABSTRACT

A chair for use by a person with limited lower-body mobility, the chair having a height adjustable seat and chair sides that fold down to form a ramp or bridge to facilitate lateral movement by a user between the chair and an adjacent surface.

19 Claims, 32 Drawing Sheets

CHAIR WITH A HEIGHT-ADJUSTABLE SEAT

FIELD OF THE INVENTION

The present invention relates to a chair for use by a person with limited lower-body mobility. In particular, the invention relates to a wheelchair having adjustable features such as a height-adjustable seat.

BACKGROUND OF THE INVENTION

Wheelchairs having adjustable features are known. Examples of same are in the following US patent documents: U.S. Pat. No. 7,055,840, Kelso, LIFT WHEELCHAIR, issued 6 Jun. 2006; U.S. Pat. No. 7,090,241, Silva, LOW-HIGH CHAIR, issued 15 Aug. 2006; US Pub. No. 2005/0236812 A1, Firth, WHEELCHAIR WITH ELEVATING SEAT, published 27 Oct. 2005; U.S. Pat. No. 7,219,912, Meyer, RAISING WHEEL CHAIR, issued 22 May 2007; U.S. Pat. No. 7,306,251, Bright et al., RECLINING WHEELCHAIR, issued 11 Dec. 2007; U.S. Pat. No. 6,142,568, Abelbeck et al., PIVOTING LINKAGE ELEVATING CHAIR, issued 7 Nov. 2000; U.S. Pat. No. 7,273,255, Nylander et al., PATIENT CHAIR WITH A VERTICALLY MOVABLE SEAT, issued 25 Sep. 2007; U.S. Pat. No. 7,222,868, Norman et al., SEATING UNIT WITH WHEELCHAIR BASE, issued 29 May 2007; and U.S. Pat. No. 7,296,960, Strong, COUPLING SYSTEM FOR ATTACHMENT OF A SEAT TO ALLOW SECURING AND/OR LIFTING THEREOF, issued 20 Nov. 2007. Further, a lightweight wheelchair having a manually adjustable seat utilizing a spring or springs to assist in upward movement of the seat is shown at www.useyourinstinct.com.

SUMMARY OF THE INVENTION

In one aspect, the present invention provides an adjustable chair for a user with reduced mobility, the chair suitable for movement of the user between the chair and an adjacent surface, the chair including: a base; a seat assembly; and a lift mechanism attached to and supported by the base, the lift mechanism supporting the seat assembly and configured for reversibly moving the seat assembly toward and away from the base; the seat assembly comprising: a seat surface; and two opposed chair sides, at least one of the chair sides reversibly pivotable relative to the seat surface between an upper position in which the chair side impedes lateral movement of a user seated on the seat surface and a lowered bridging position in which the chair side may support a user moving laterally between the seat surface and an adjacent surface; whereby, the lift mechanism and chair side may be used to selectively facilitate lateral movement of a user between the seat surface and a surface on which the base is resting and between the seat surface and a surface higher than the surface on which the base is resting.

The reversibly pivotable chair side may include: an inner chair side member having a proximal edge adjacent the seat surface and a distal edge; and an outer chair side member having a proximal edge pivotably connected to the inner chair side member distal edge, wherein, in use, in the upper position, the inner and outer chair side members may be in a folded side-by-side configuration and in the lowered bridging position, the inner and outer chair side members may be in an extended unfolded configuration.

The pivotable connection between the inner chair side member and the outer chair side member may be configured to impede relative pivotal movement as between the inner chair side member and the outer chair side member beyond about 180 degrees from the folded side-by-side configuration, whereby in the extended unfolded configuration, the inner chair side member and the outer chair side member together function as a generally planar bridging span.

The seat assembly may include a calf support reversibly pivotable relative to the seat surface between a downward position and a projecting position, wherein, moving the seat assembly toward the base brings the calf support into contact with the base causing the calf support to move toward the projecting position.

The base may include two footrests. Each footrest may reversibly move from a foot-supporting position to a non-projecting position responsive to movement of the seat assembly toward the base. The chair may include two springs, each spring connected to a respective footrest so as to bias the footrest toward the foot-supporting position; and a cam assembly connected to the footrests and configured to contact the seat assembly as it moves toward the base and pivot responsive to such contact and draw the footrests toward the non-projecting position. The cam assembly may include two cams, each cam connected to a respective footrest.

The lift mechanism may include: a frame comprising two spars, spaced apart one from the other in a generally parallel relationship; and a drive column interposed between the two spars; and the seat assembly may include: two spar mount assemblies, slidably mounting the seat assembly to each of the spars so as to permit movement of the seat assembly along the length of the spars; and a drive engager connecting the seat assembly to the drive column. The drive column may include a rotatable threaded rod and the drive engager comprises a rotationally fixed threaded member threadedly mated with the rod whereby rotation of the threaded rod causes the drive engager to move along the length of the rod. The threaded rod may be drivably connected to an electric motor. The threaded rod may be configured for manual rotation. The frame may be pivotably attached to the base, wherein the frame and base may be pivoted relative to one another between one or more in-use positions in which the spars projects from the base and a storage position in which the spars generally overly the base. The chair may include securing assemblies for selectively releasably securing the frame and base in a plurality of in-use positions. The securing assemblies may include at least one adjustable brace extending between the frame and base.

The chair may include two caster wheels mounted in the vicinity of a forward end of the base and a drive wheel assembly. The drive wheel assembly may include: two wheel arms, each having a proximal end and a distal end, and each pivotally mounted to the seat assembly at the proximal end; and two manually operable wheelchair wheels, each mounted to the distal end of a respective wheel arm; and the chair may include a forward lock assembly for releasably securing the wheelchair wheels in one or more forward positions for manual drive operation; wherein, when released from the one or more forward positions for manual drive operation, the wheel arms are free to pivot rearward responsive to contact between the wheelchair wheels and an adjacent surface as the seat assembly is moved toward the base.

Each wheelchair wheel may include a projecting axle stub; each wheel arm may include at its distal end an axle block, each axle block having one or more through-bores configured to releasably receive an axle stub; the seat assembly may also include two axle plates, each axle plate operably associated with a respective on of the axle blocks and each axle plate having one or more receptacles configured to releasably receive an axle stub; wherein the forward lock assembly comprises the axle stubs, axle blocks and axle plates, in that each axle block and the associated axle plate are configured such that the axle stub of one of the wheelchair wheels may be inserted through the axle block into the axle plate with the wheelchair wheel in one of the one or more forward positions.

The chair may also include two secondary support wheels mounted in the vicinity of a rearward end of the base and a brake assembly for frictionally engaging a surface below the base. The brake assembly may include a manually operable brake cam having a friction-inducing braking material.

The drive wheel assembly may include two electrically driven wheels mounted to the base. Each electrically driven wheel may include an integral motor and the base may include two electric wheel mounts having a plurality of mounting positions. The chair may also include two stabilizer wheels adjustably mounted in the vicinity of a rearward end of the base, wherein the stabilizer wheels may be selectively moved in a rearward-forward direction and releasably secured in a position providing a desired impediment to rearward tipping of the chair.

The seat assembly may also include a seat surface extender pivotally mounted in the vicinity of a forward edge of the seat surface and pivotal between an underslung position and a projecting position.

DETAILED DESCRIPTION WITH REFERENCE TO THE DRAWINGS

Figure 1:
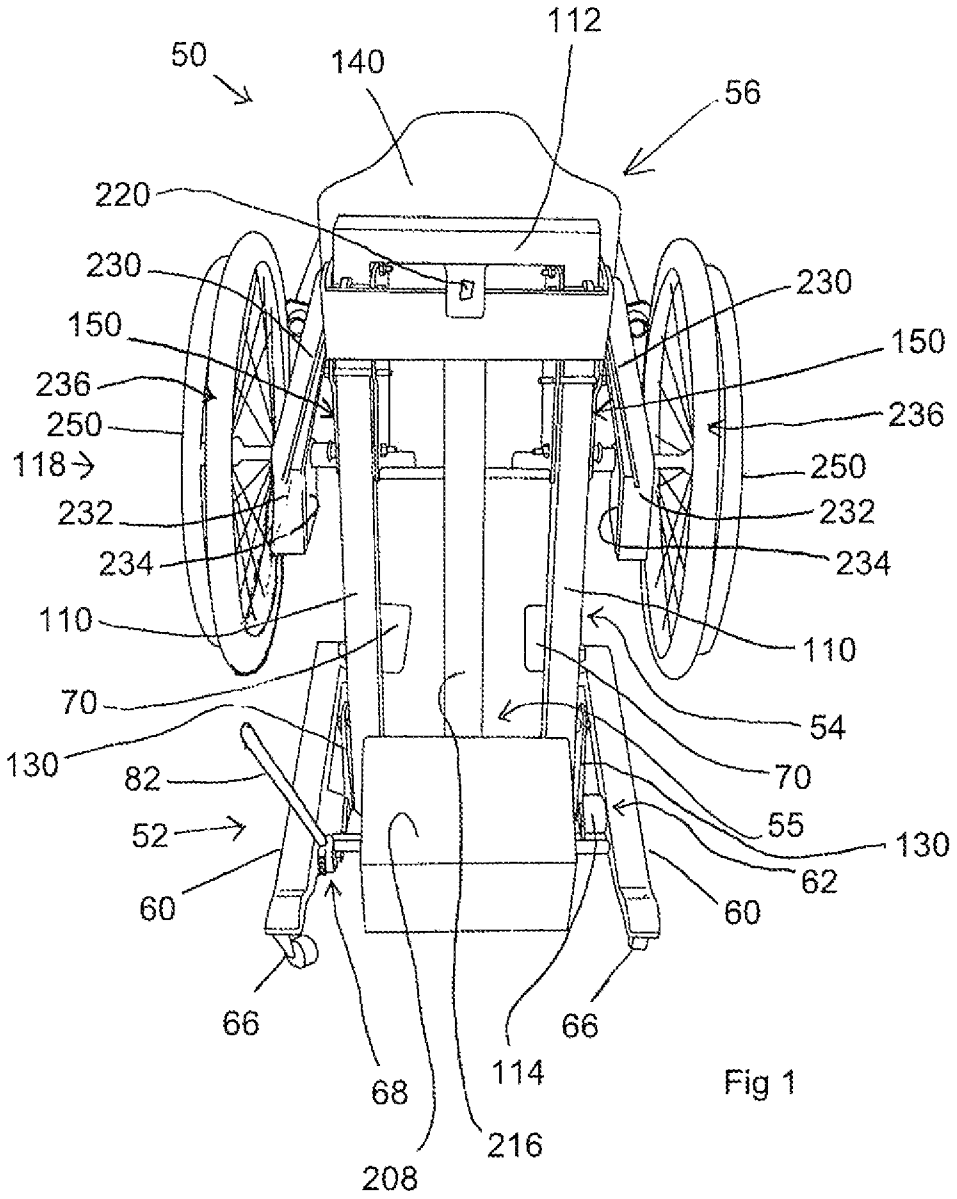
FIG. 1 is a rear perspective view of a wheelchair embodiment of the present invention showing the seat assembly raised to the vicinity of a top position and showing the wheels mounted.
Figure 2:
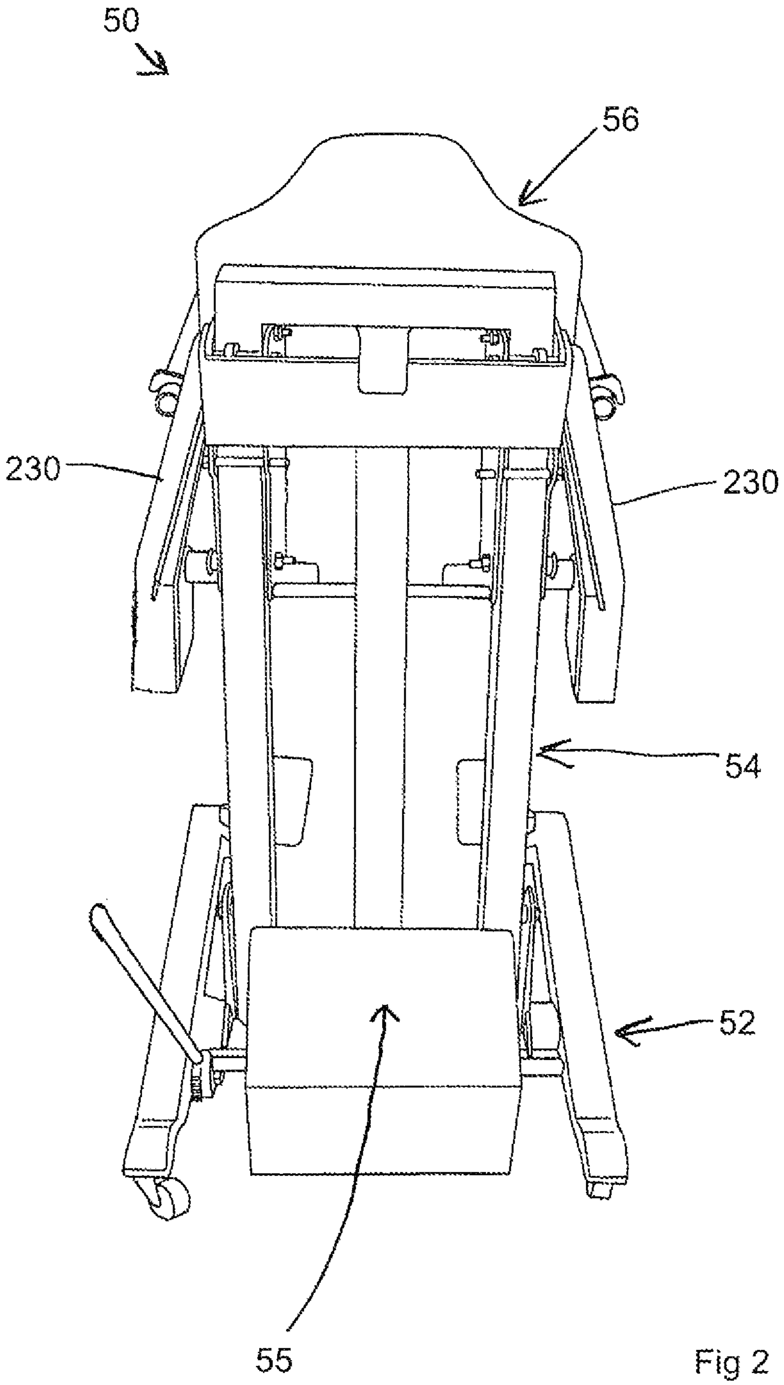
FIG. 2 is a rear perspective view of the embodiment of FIG. 1 showing the seat assembly raised to the vicinity of a top position with the wheels removed.
Figure 3:
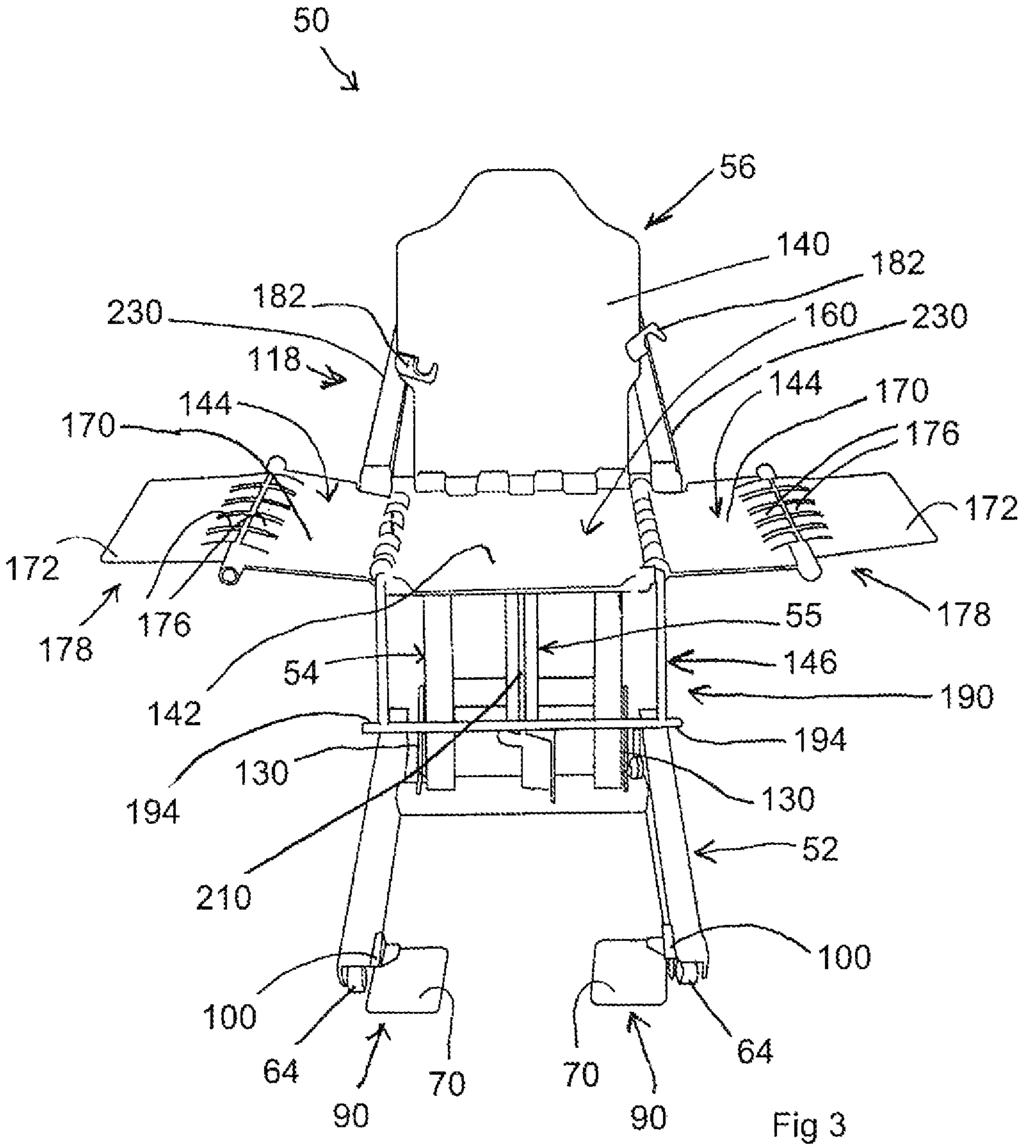
FIG. 3 is a front perspective view of the embodiment of FIG. 1 showing the seat assembly raised to the vicinity of a top position with the wheels removed and with each of the chair sides in the ramp position (the feature of the adjacent environment supporting the chair sides in the ramp position is not shown in the drawing).
Figure 4:
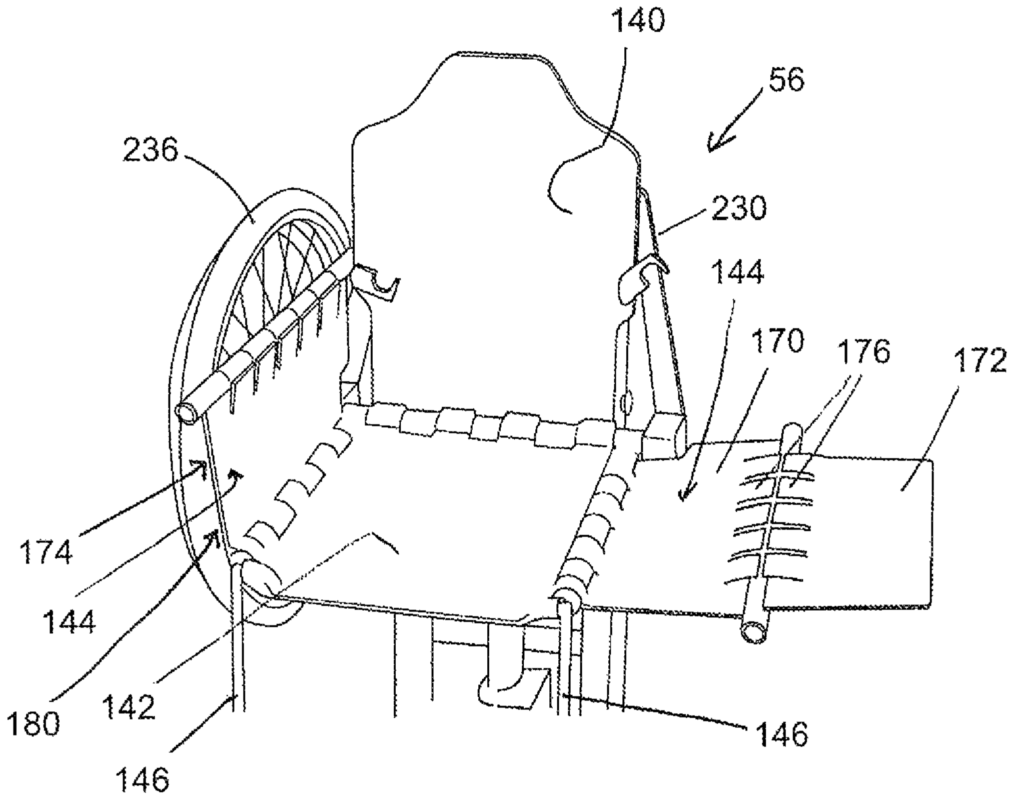
FIG. 4 is a partial front perspective view of the embodiment of FIG. 1 showing the seat assembly raised to the vicinity of a top position with one wheel removed and with one of the chair sides in the ramp position (the feature of the adjacent environment supporting the chair side in the ramp position is not shown in the drawing).
Figure 5:
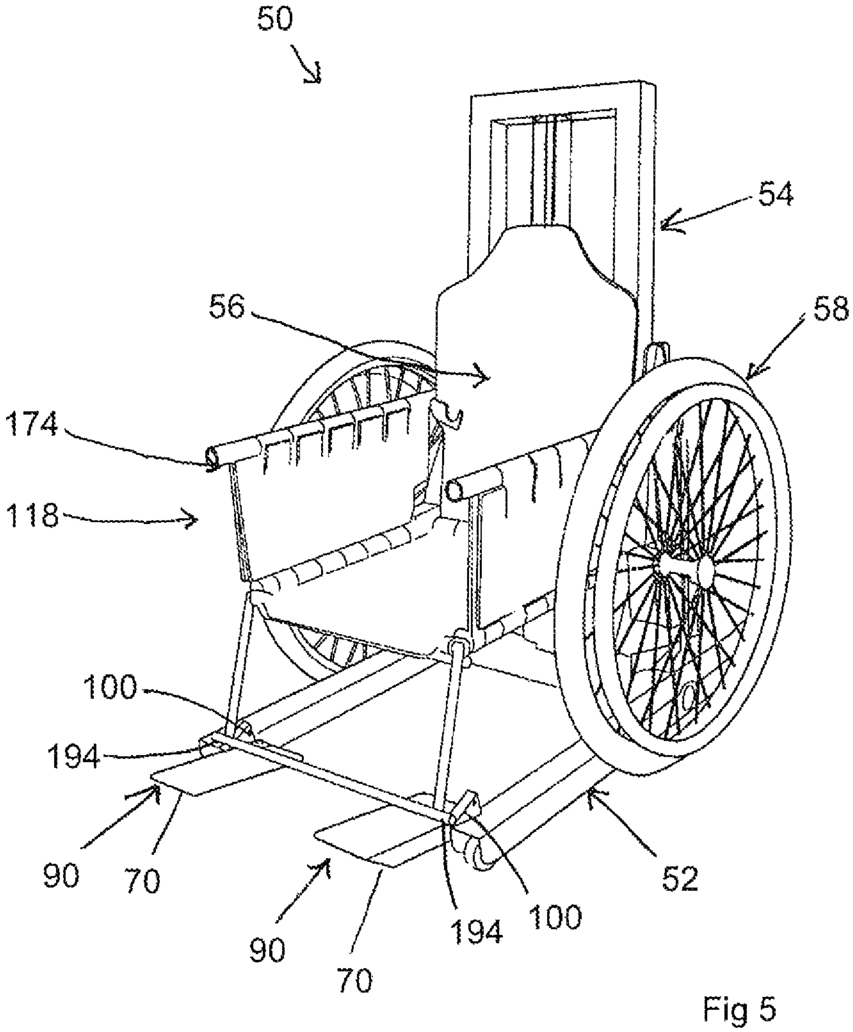
FIG. 5 is a front and side perspective view of the embodiment of FIG. 1 in the wheeling position wherein the wheelchair wheels are both mounted and the wheels are in sufficient frictional contact with the supporting surface that the wheelchair can be moved by rotation of the wheels.
Figure 6:
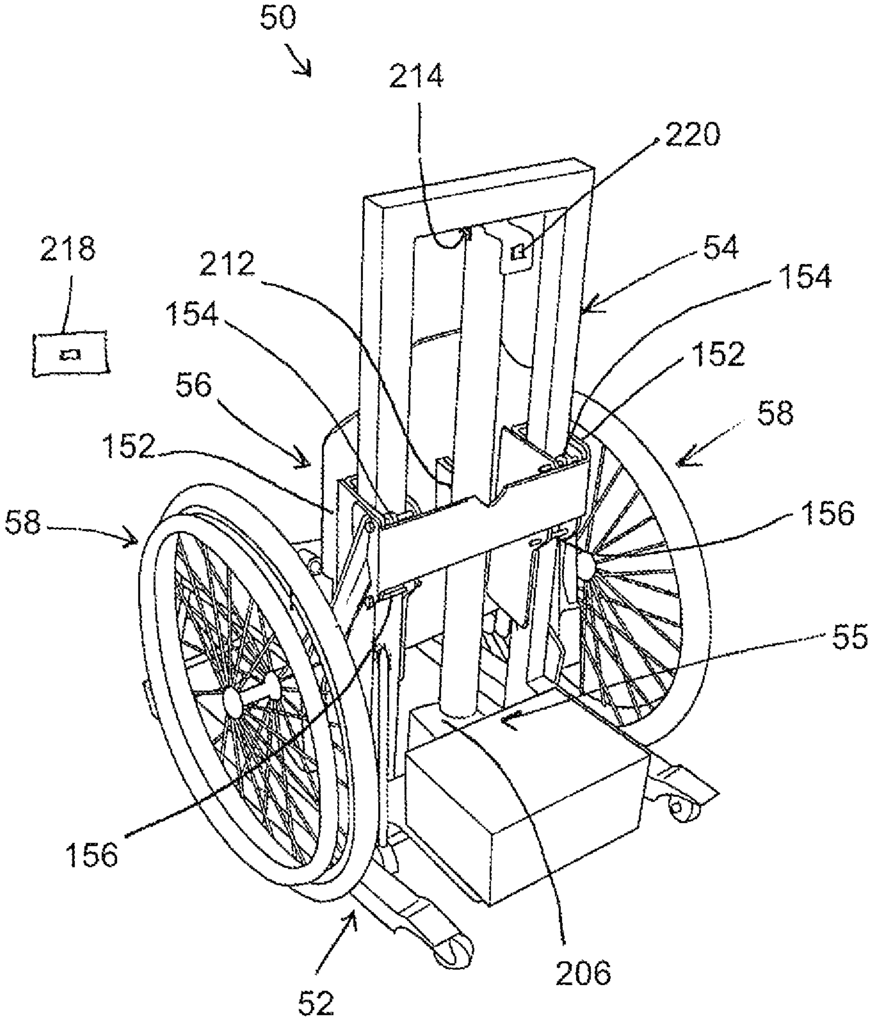
FIG. 6 is a rear and side perspective view of the embodiment of FIG. 1 in the wheeling position shown in FIG. 5.

There is shown in FIGS. 1-18 adjustable wheelchair 50 embodiments of the present invention. The cushioning and padding, and the protective enclosures of some of the components, that would be present in an actual wheelchair of the sort described herein, are not shown in the drawings for the purpose of clarity of description.

As shown in FIGS. 1-3 and 5, among others, the wheelchair 50 includes a base 52, a frame 54 pivotally attached to the base 52, a seat assembly 56 slidably mounted to the frame 54, a drive assembly 57 mounted to the frame 54, and two wheel assemblies 58 mounted to the seat assembly 56.

The base 52 includes two spaced-apart parallel side struts 60, a pivot strut 62 spanning the space between the side struts 60, two rollers 64 (each roller 64 at the forward end of a side strut 60), two castors 66 (each castor 66 at the rearward end of a side strut 60), a brake mechanism 68, and two footrests 70 (each footrest 70 at the inner side of the forward end of a side strut 60).

The rollers 64 are preferably releasably securable in two distinct functional configurations, being: a fixed configuration, in which the rollers 64 are fixed in position to roll in a direction essentially parallel with the side struts 60; and a castoring configuration, in which the rollers 64 are free to swivel about a generally vertical axis.

As shown throughout the drawings and in detail in FIGS. 12-15, the brake mechanism 68 includes two brake pads 72, each disposed in an associated side strut 60. The brake pads 72 are attached one to another by a brake shaft 74 spanning the space between the side struts 60 and rotatably mounted to the side struts 60. A pinion gear 76 is fixed to the brake shaft 74 in the vicinity of a side strut 60. Pivotally mounted to the side strut 60 there is a modified gear 78 located so as to intermesh with the pinion 76 and having an upwardly projecting brake stub 80 suitable for engaging a brake handle 82. The gear ratio of the pinion 76 and modified gear 78 is such that a relatively small pivotal movement of the brake handle 82 produces a relatively large rotation of the pinion 76 and brake shaft 74 so as to rotate the brake pads 72 between a recessed no-brake position 84 and a projecting brake position 86. The brake pads 72 are preferably made from a material with suitable frictional qualities to impede sliding on conventional floor surfaces, while also being non-marring and non-marking. As an alternative, a braking device for the wheelchair 50 could be actuated by a remotely controlled motor.

As shown in FIGS. 3, 5, 7, and 10, among others, each footrest 70 is pivotally mounted to the associated side strut 60 so as to be pivoted between a projecting position 90 suitable for supporting a foot of the user and a folded position 92 in which each footrest 70 is oriented about 90° or more inwardly from the projecting position 90. Each footrest 70 is resiliently biased in the projecting position 90 by a bias cable 94 and bias spring 96. The distal end of a folding cable 98 is attached to each footrest 70. The attachment of the proximal ends of the folding cables 98 is discussed below. Each footrest 70 includes a wedge guide 100. Associated with each footrest 70 there is preferably a releasable lock 102 for releasably securing the footrest 70 in the folded position 92 so as to reduce the overall size of the wheelchair 50 when in the collapsed position 120.

As shown in FIGS. 1, 2, 6, 8-10, 18, 22, 24 and 25, among others, the frame 54 includes two spaced-apart parallel spars 110, a cross brace 112 and a pivot mount 114. The pivot mount 114 is a round pipe within which the pivot strut 62 is disposed. The pivot strut 62 is sized and shaped so as to permit relative rotational movement between the pivot strut 62 and pivot mount 114 with limited relative lateral movement. Preferably, the pivot strut 62 is also a round pipe. The pivot strut 62 and pivot mount 114 have holes that align for receiving pins 116 for releasably securing the pivot strut 62 and pivot mount 114 in a functional position 118 in which the base 52 and frame 54 are in essentially an inverted T configuration. With the pins 116 removed the base 52 and frame 54 may be pivoted relative to each other to a collapsed position 120.

Figure 24:
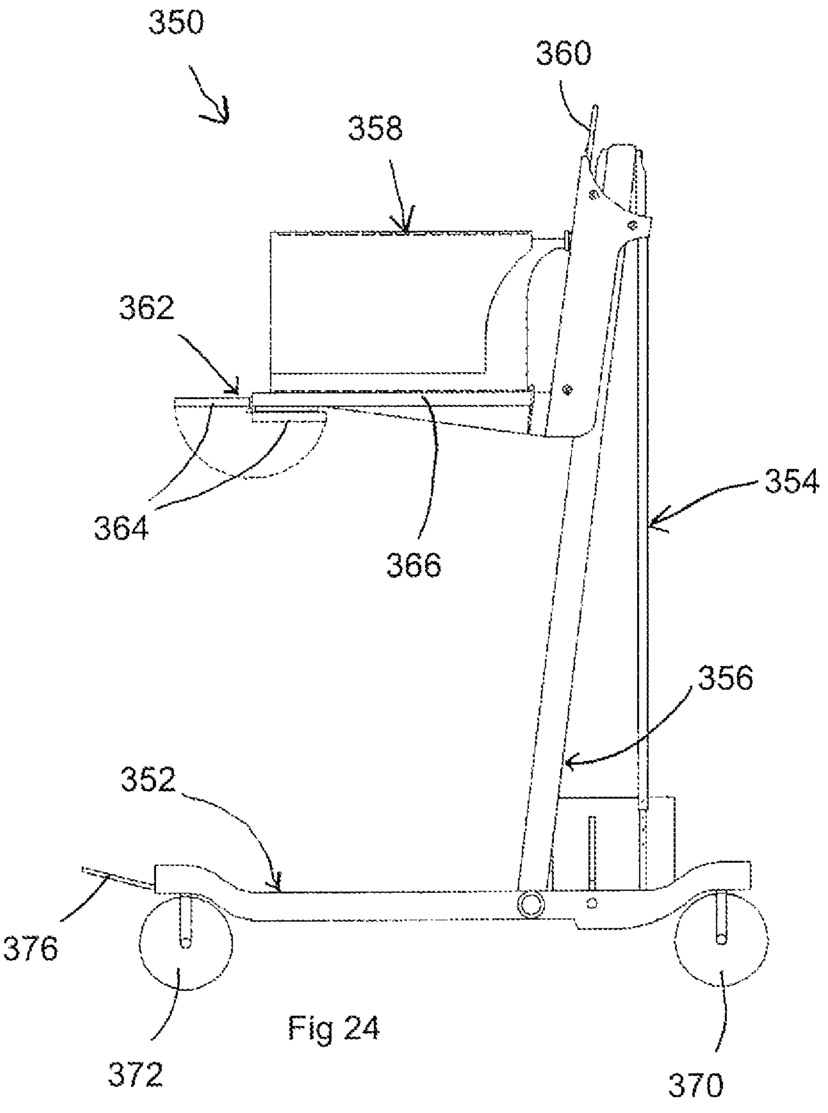
FIG. 24 is a side elevation view of a push-chair embodiment of the present invention shown with a raised seat.
Figure 25:
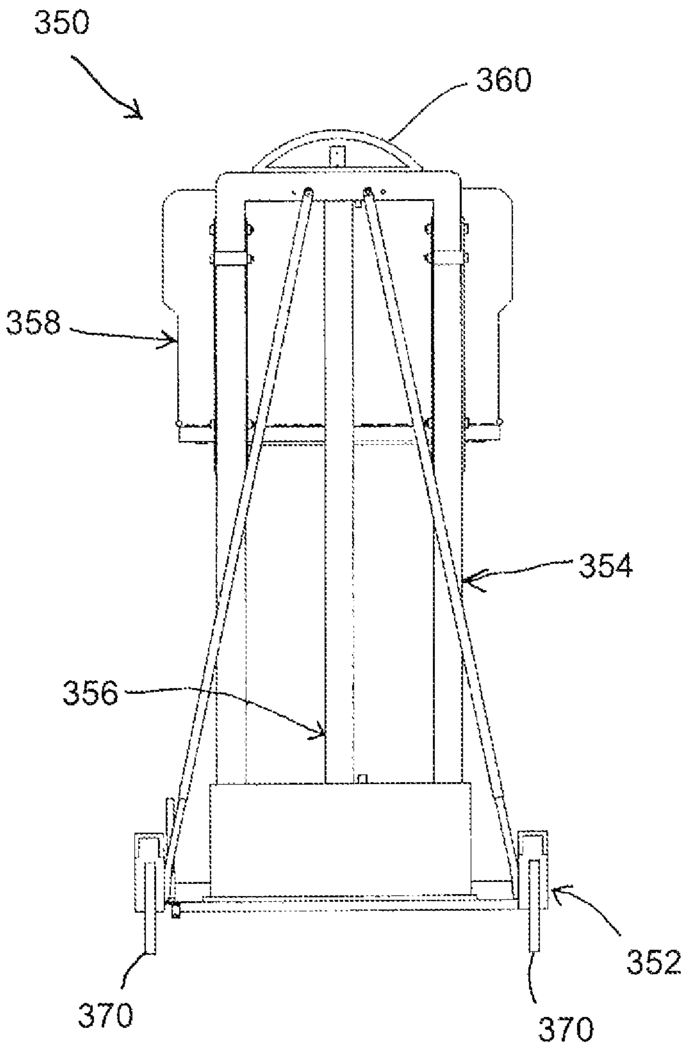
FIG. 25 is a rear elevation view of the embodiment of FIG. 24 shown with a raised seat.
Figure 26:
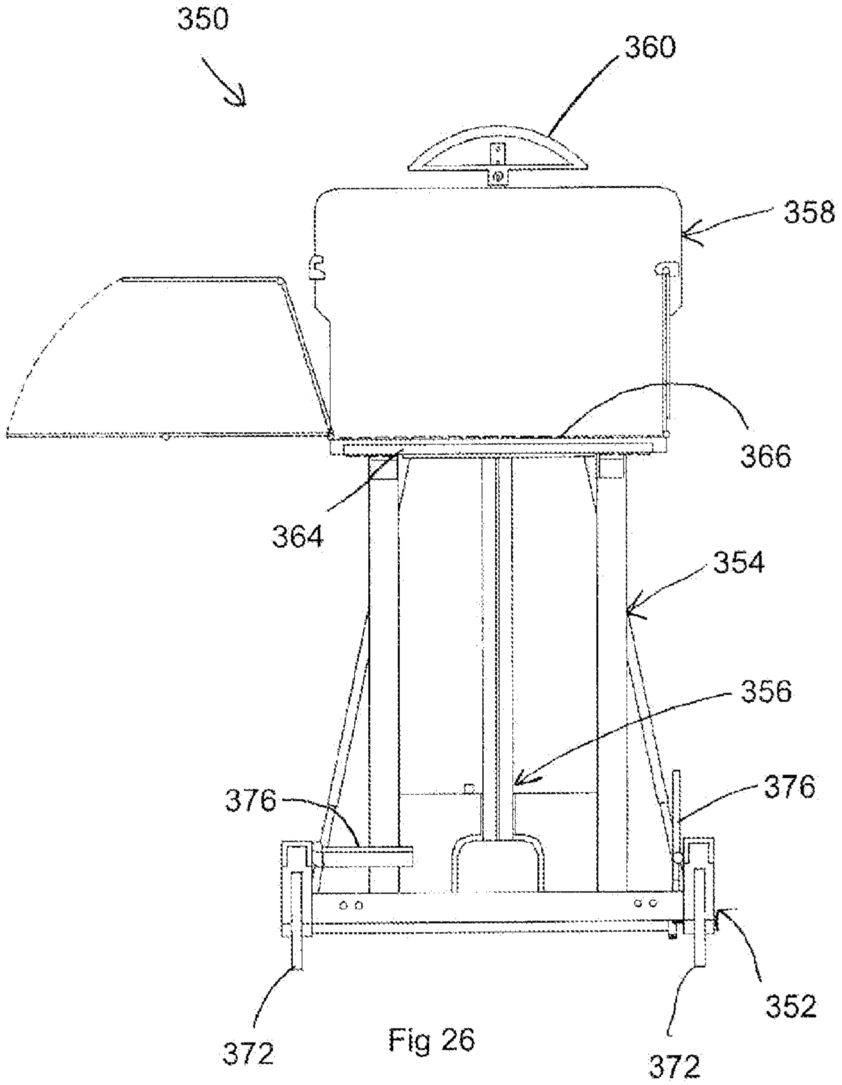
FIG. 26 is a front elevation view of the embodiment of FIG. 24 shown with a raised seat and illustrating the deployment of a chair side.
Figure 27:
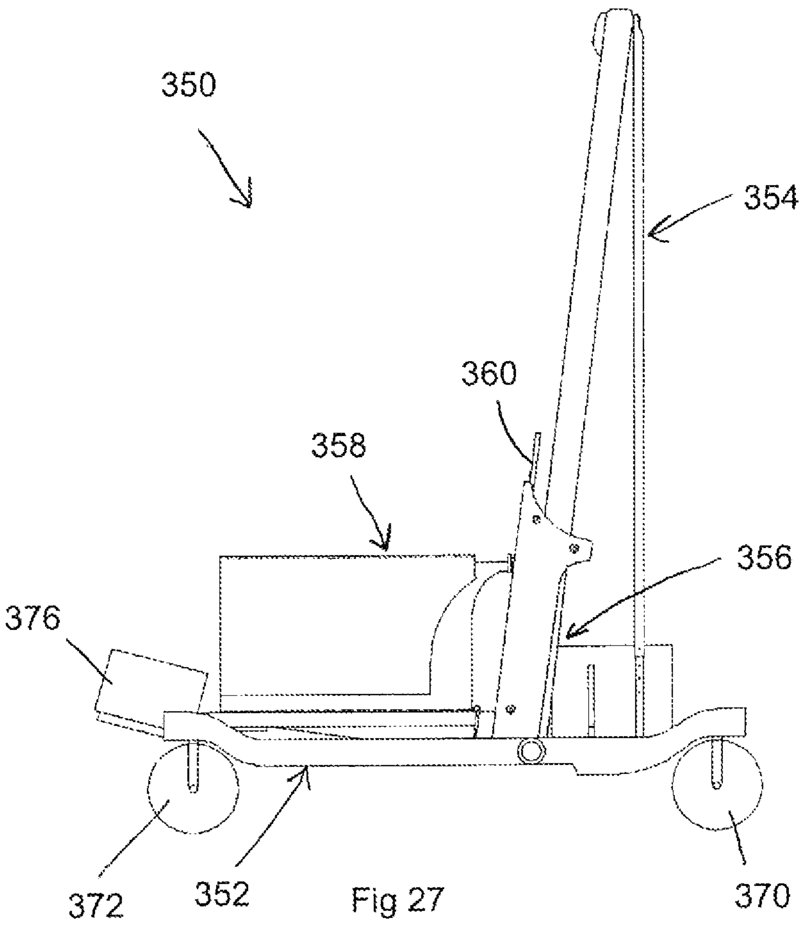
FIG. 27 is a side elevation view of the embodiment of FIG. 24 shown with a lowered seat.
Figure 28:
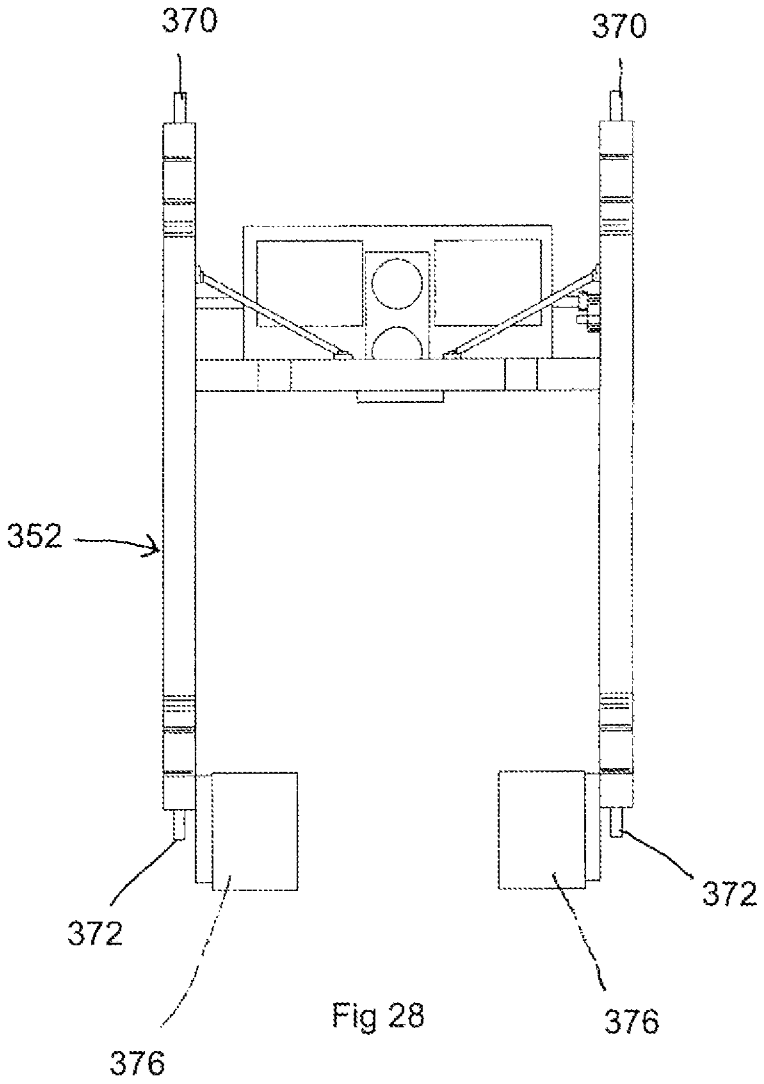
FIG. 28 is a top plan view of the embodiment of FIG. 24, shown without the seat assembly.

As shown in FIGS. 24 and 25, handles 122 may be mounted to the frame 54 for use by an attendant assisting the user of the wheelchair 50. Preferably the handles 122 are configured to be folded in when not in use.

Figure 17:
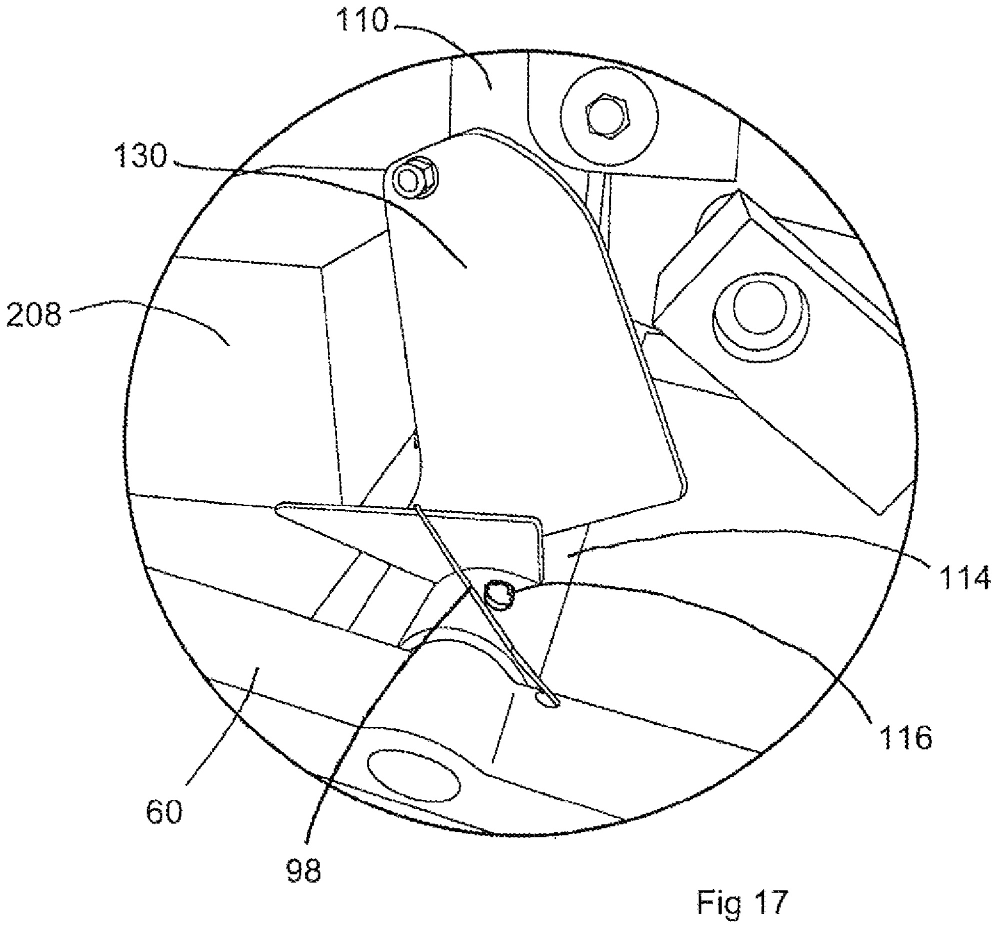
FIG. 17 is an isolation perspective view of the embodiment of FIG. 1 showing a footrest cam and adjacent features.
Figure 18:
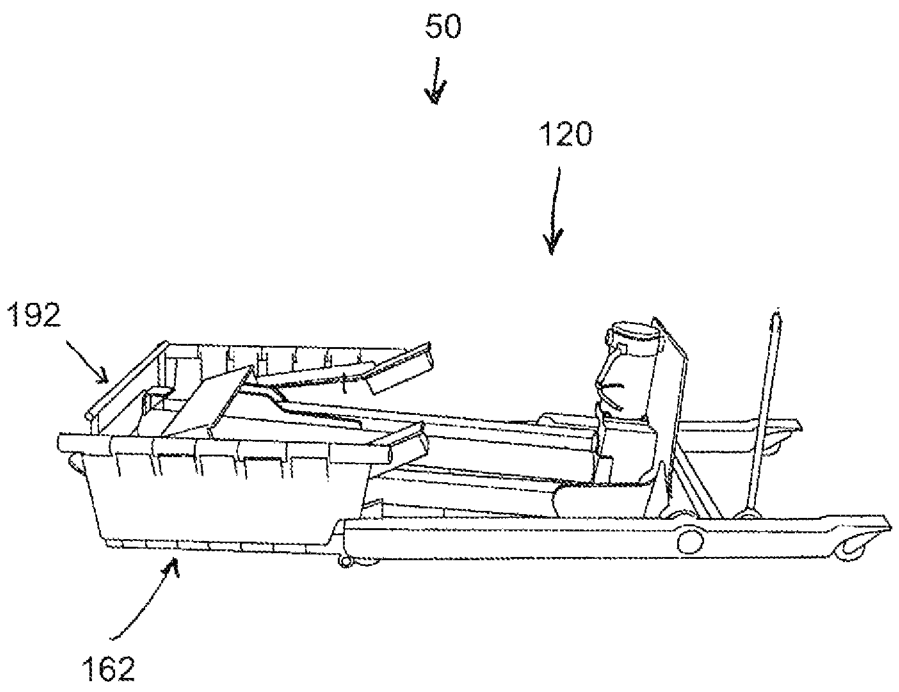
FIG. 18 is a side perspective view of the embodiment of FIG. 1 shown in the collapsed position.

As shown throughout the drawings and in detail in FIG. 17, two footrest cams 130 are pivotally mounted to the frame 54. One footrest cam 130 is mounted to a spar 110 in the vicinity of the adjacent side strut 60 and the other footrest cam 130 is mounted to the other spar 110 in the vicinity of the side strut 60 adjacent thereto. The proximal end of one folding cable 98 is attached to one of the footrest cams 130 and the proximal end of the other folding cable 98 is attached to the other of footrest cams 130, in such a manner that pivotal movement of the footrest cams 130 away from the footrests 70 causes the footrests 70 to move from the projecting position 90 to the folded position 92. As an alternative to the footrest cams 130, folding cable 98 etc., movement of the footrests 70 between the projecting position 90 and the folded position 92 could be effected by an assembly comprising suitable motors and sensors.

As shown in FIGS. 3, 4, 5, 7, 9, 10, and 19-22, among others, the seat assembly 56 includes a chair back 140; a seat 142, pivotally attached to the chair back 140; two chair sides 144, each pivotally attached to a side of the seat 142; and a calf support 146, pivotally attached to the seat 142 opposite the chair back 140. Although not shown in the drawings, each of the chair back 140, seat 142, chair sides 144 and calf support 146 would include cushioning and padding in use.

The chair back 140 is slidably attached to the spars 110 by way of spar mount assemblies 150, which include spar brackets 152, bearings 154 and retainers 156.

The range of pivotal movement as between the chair back 140 and seat 142 is such that the chair back 140 and seat 142 can be moved between a conventional seating position 160 and a storage position 162 in which the seat 142 is folded against the chair back 140, essentially as closely as is permitted by the cushioning on the chair back 140 and seat 142.

Each chair side 144 includes an inner plate 170 and an outer plate 172. The inner plate 170 and outer plate 172 are pivotally attached one to the other and may be folded into a side-by-side position 174. The inner plate 170 and outer plate 172 each have pivot stops 176 that impede relative pivotal movement beyond about 180° from the side-by-side position 174, being the ramp position 178.

The inner plate 170 is the component of each chair side 144 that is pivotally attached to the seat 142. The pivotal attachment between each inner plate 170 and the seat 142 permits free movement of the inner plate 170 from an upright position 180, in which the relevant chair side 144 is releasably secured to the chair back 140 with a chair-side catch 182, to a downward position 178 in which the chair side 144 may be used in the ramp position 178 so as to abut part of the surrounding environment (e.g. the floor, a vehicle seat etc.).

The calf support 146 includes a laterally extending cushioning pad (not shown) suitable for abutting the user's lower leg during use. The calf support 146 is free to pivot relative to the seat 142 between a calf-support downward position 190 and a calf-support upward position 192 in which the calf support 146 is at about 90° relative to the seat 142.

Figure 7:
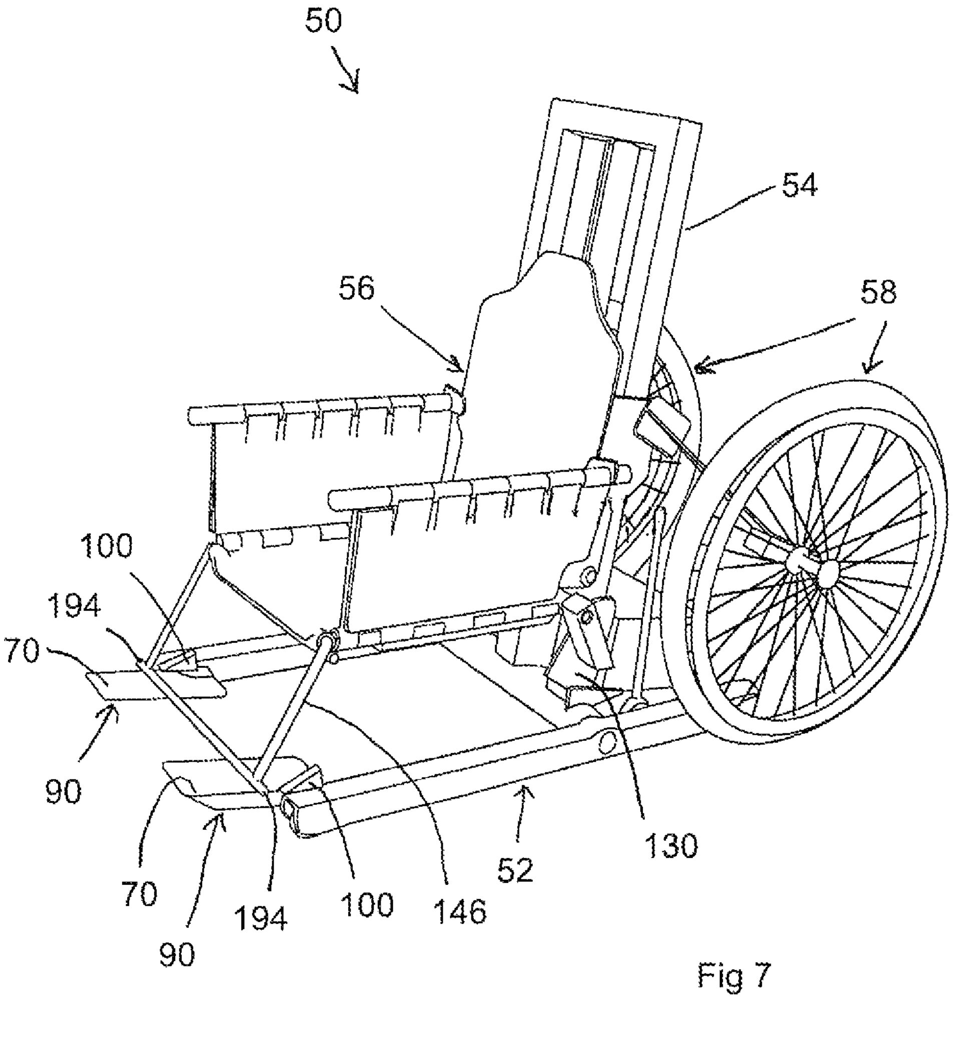
FIG. 7 is a generally side perspective view of the embodiment of FIG. 1 shown in a partially lowered position with the wheelchair wheels pivotted rearward.
Figure 8:
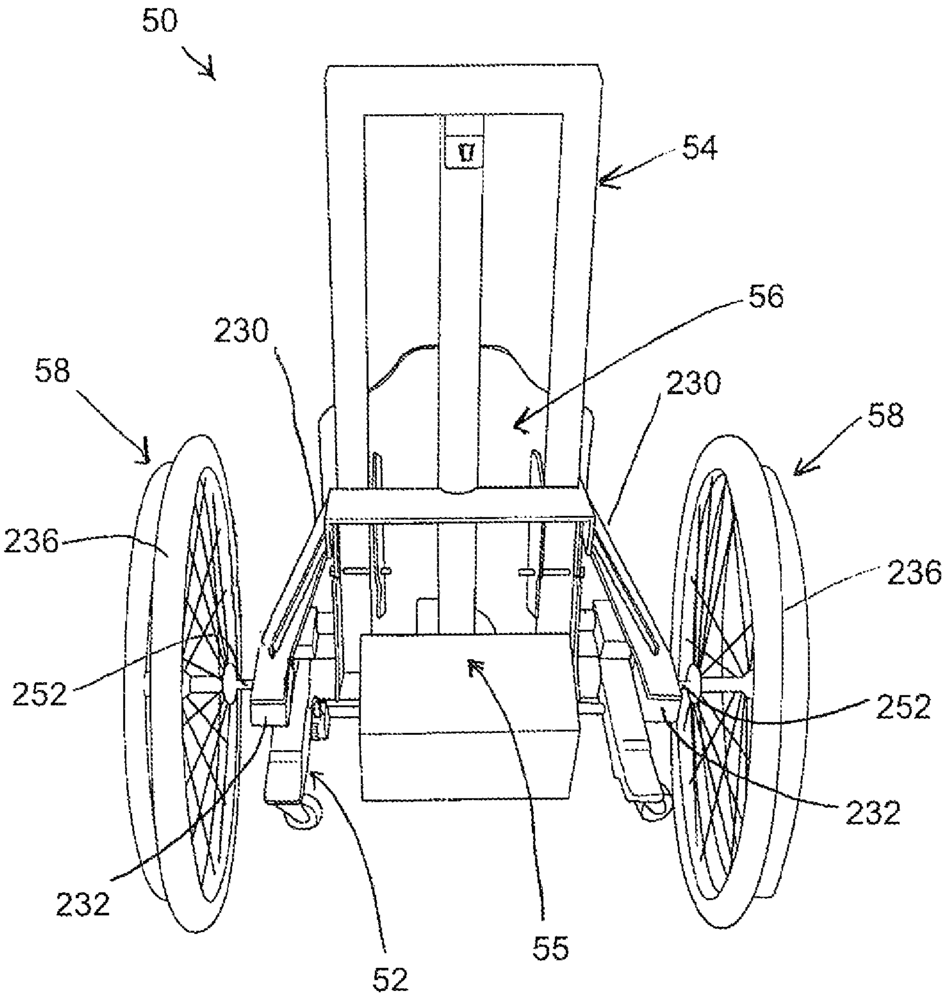
FIG. 8 is a rear perspective view of the embodiment of FIG. 1 shown in vicinity of a fully lowered position with the wheelchair wheels pivotted rearward, with one of the chair sides in the ramp position and with the calf support in the inclined position (the feature of the adjacent environment supporting the chair side and calf support in their respective positions, e.g., the floor or ground, is not shown in the drawings).

The calf support 146 includes at its distal end a slider 194. The slider 194 is configured and positioned such that when the calf support 146 is in the calf-support downward position 190 and the footrests 70 are in the projecting position 90, lowering the seat assembly 56 towards the base 52, brings the slider 194 into contact with the wedge guides 100, which compels the calf support 146 to pivot relative to the seat 142 in a direction away from the frame 54, as shown in FIG. 7.

Further lowering the seat assembly 56 towards the base 52 brings the slider 194 into contact with the upper surface of the body of the footrests 70, which compels further pivoting of the calf support 146 relative to the seat 142 in a direction away from the frame 54. The upper surface of the body of the footrests 70 may be configured to facilitate sliding of the slider 194 along the footrests 70, such as with a longitudinally extending ridge having a reduced-friction surface or made from a reduce-friction material.

Figure 9:
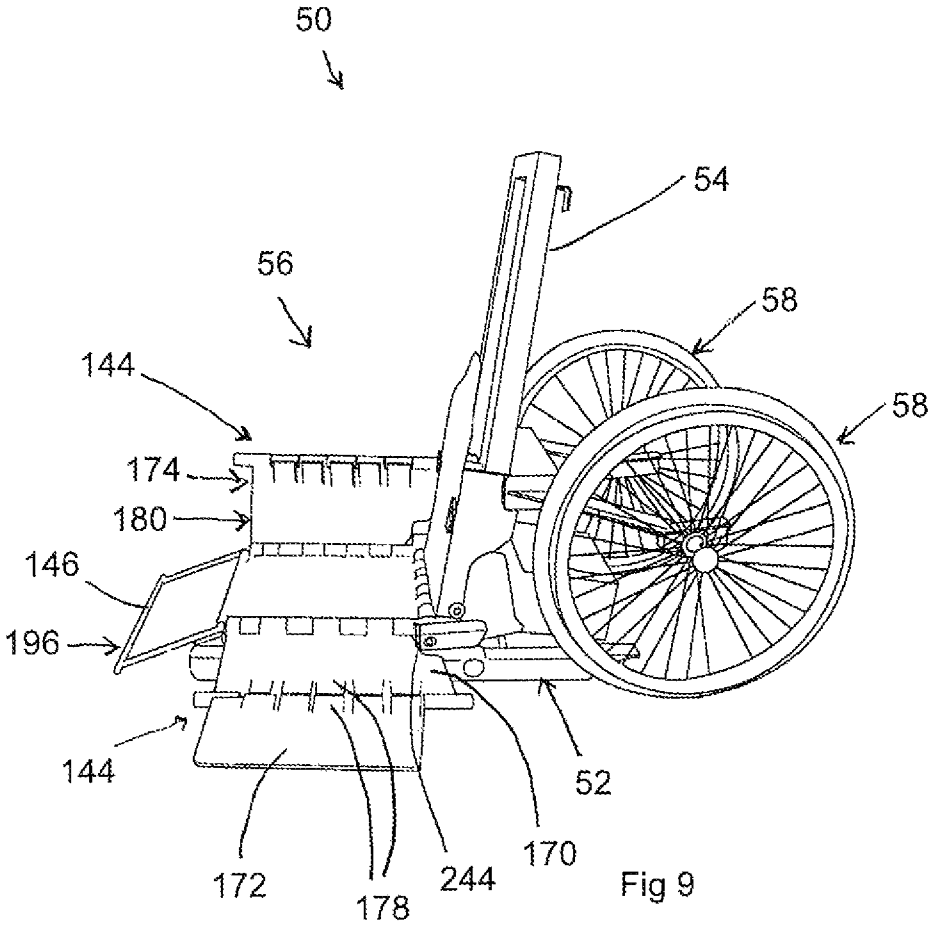
FIG. 9 is a side perspective view of the embodiment of FIG. 1 shown in the position shown in FIG. 8.
Figure 10:
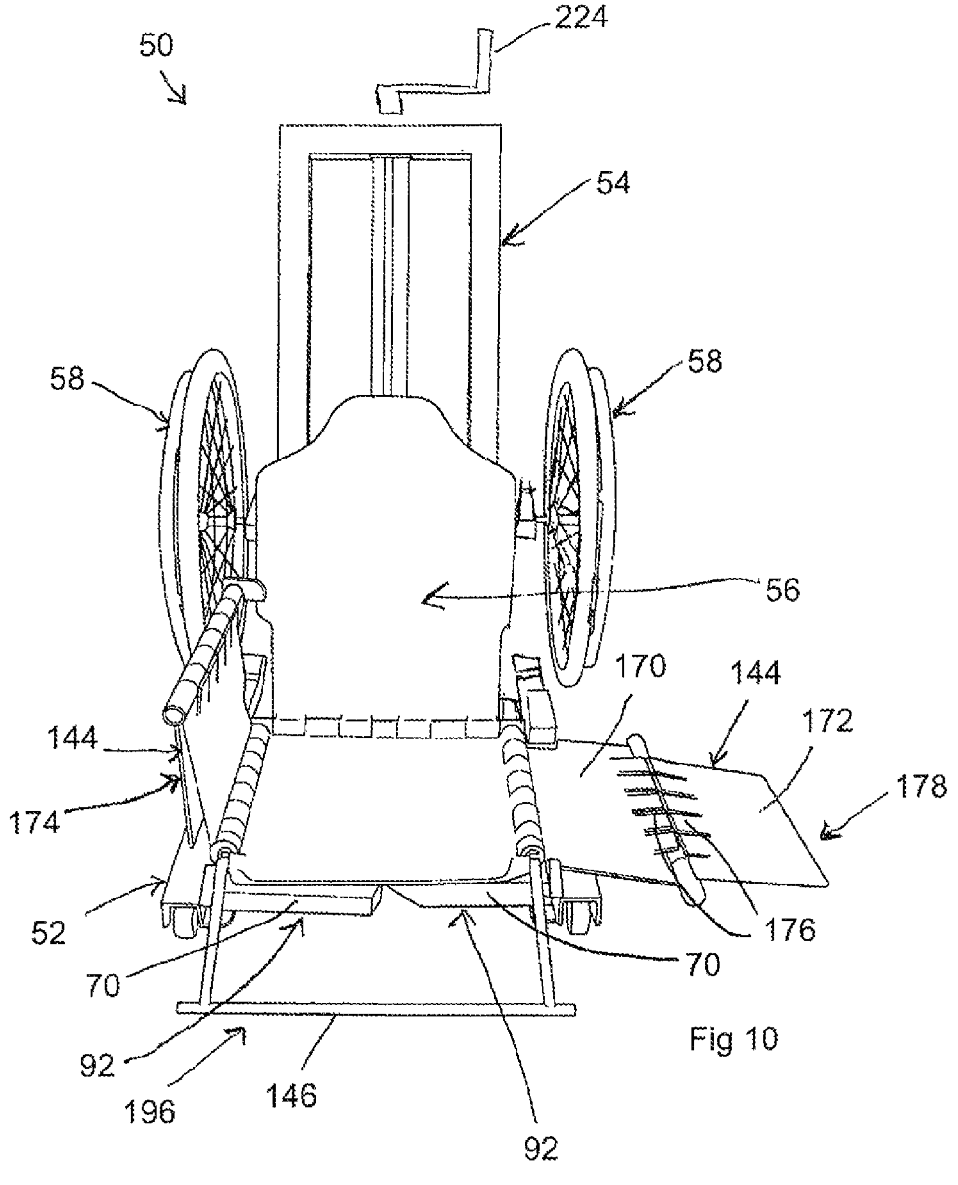
FIG. 10 is a front perspective view of the embodiment of FIG. 1 shown in the position shown in FIG. 8.

Turning to FIGS. 9 and 10, even further lowering the seat assembly 56 towards the base 52 brings the slider 194 into contact with an adjacent supporting surface (e.g., the floor or the ground), which compels further pivoting of the calf support 146 relative to the seat 142 in a direction away from the frame 54. Such even further lowering of the seat assembly 56 also brings the seat assembly 56 into contact with the footrest cams 130, causing the footrest cams 130 to pivot so as to draw on the folding cables 98 causing the footrests 70 to move towards the folded position 92.

Ultimately, with sufficient lowering of the seat assembly 56 towards the base 52 the calf support 146 assumes an inclined position 196, thus providing an inclined planar surface suitable to assist a person with limited or no lower body movement, in moving between the adjacent supporting surface and the seat 142.

The slider 194 shown in the drawings is an elongate generally cylindrical member. The slider 194 may include non-slip surfaces, bearings or other suitable means for enhancing the ability of the slider 194 to slide across the components and surfaces with which it comes into contact during use.

Figure 11:
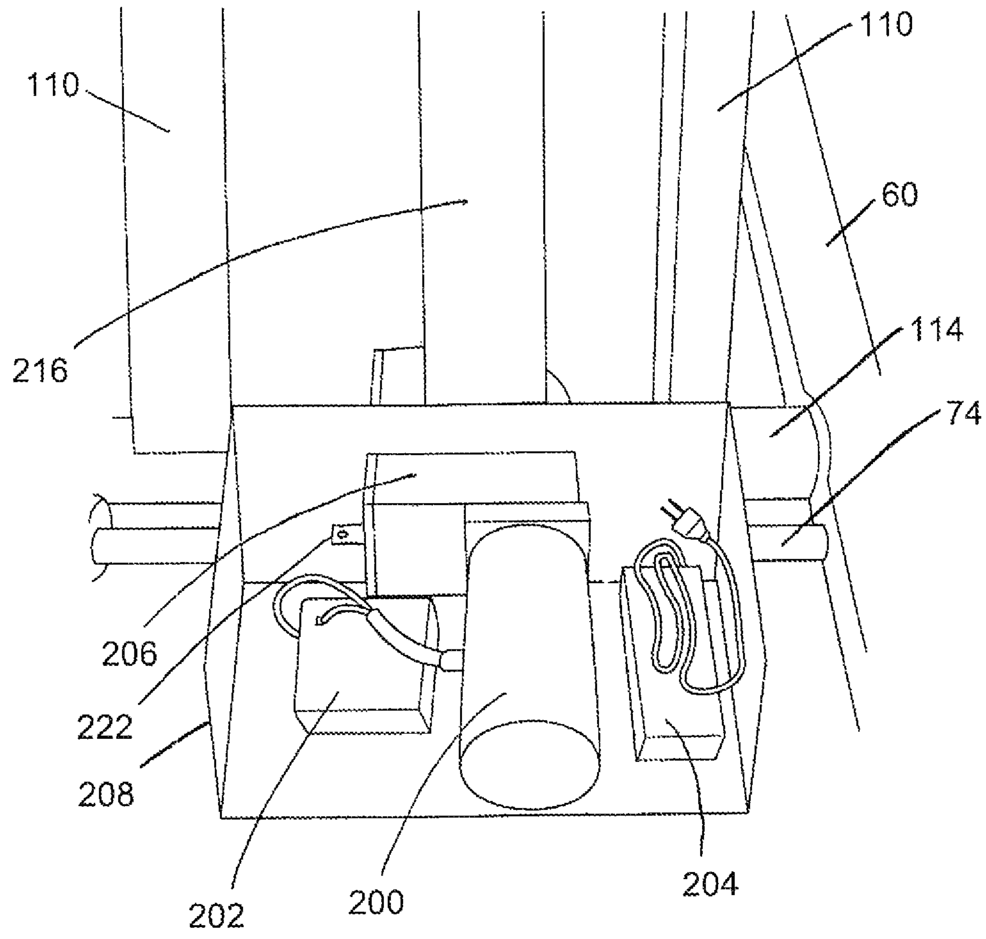
FIG. 11 is a partial rear perspective view of the embodiment of FIG. 1 showing drive assembly components.
Figure 12:
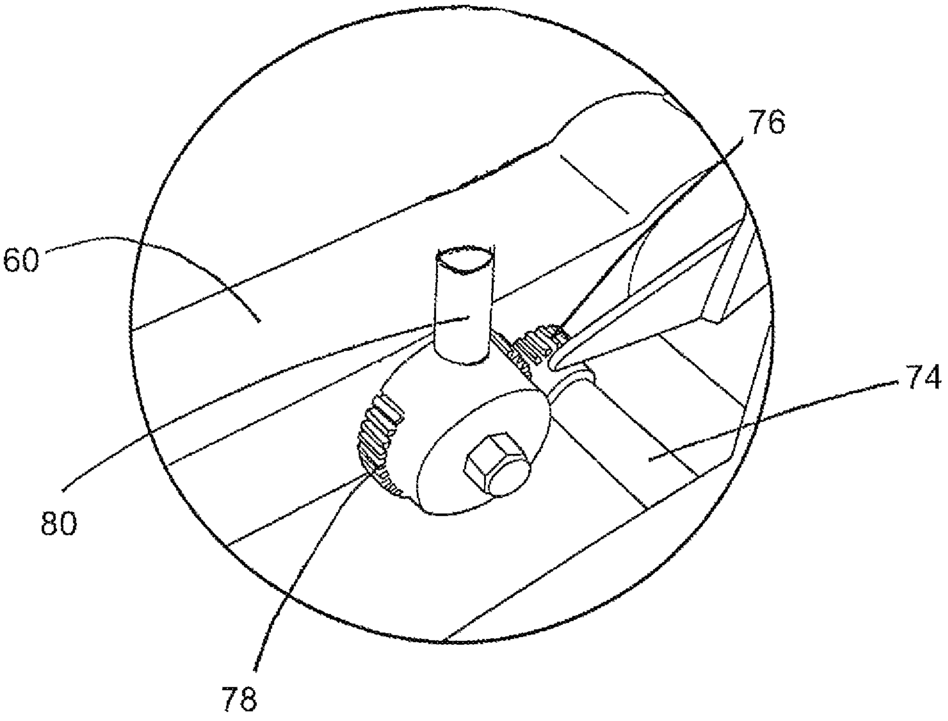
FIG. 12 is an isolation perspective view of the embodiment of FIG. 1 showing brake components.
Figure 13:
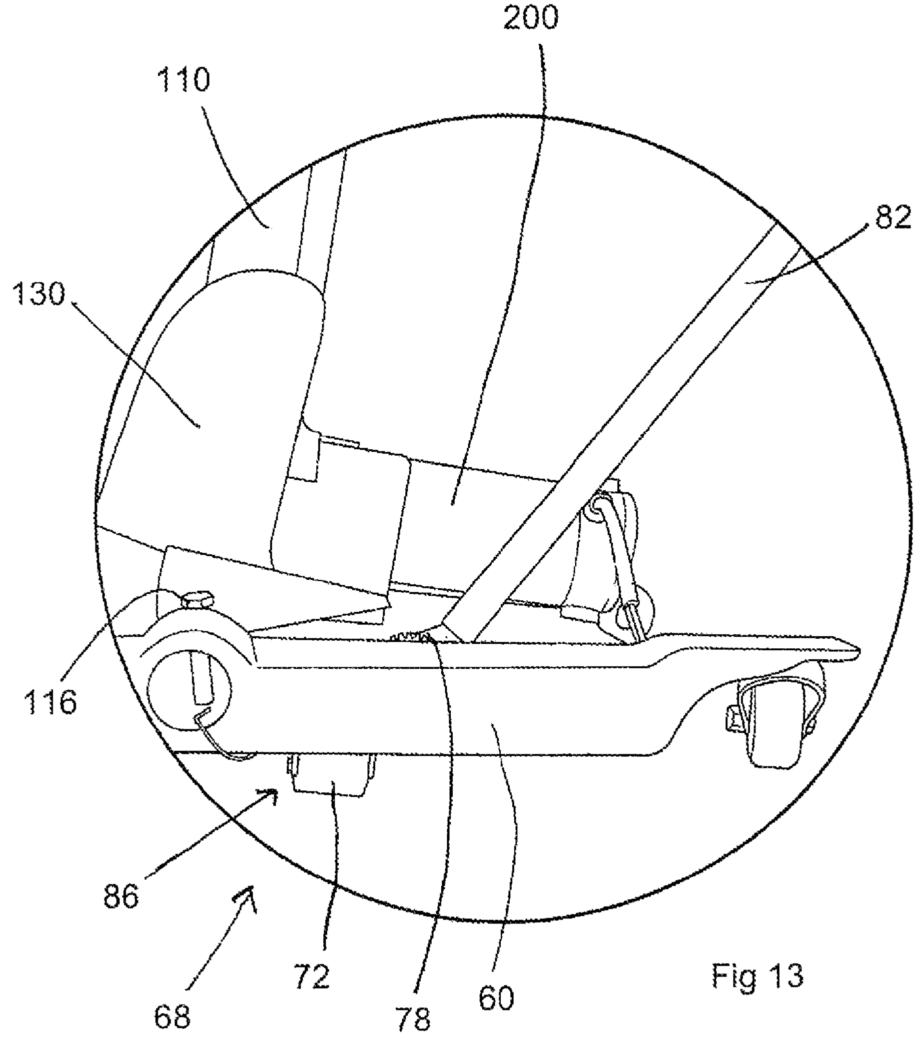
FIG. 13 is an isolation side perspective view of the embodiment of FIG. 1 showing brake components in the brake position.
Figure 14:
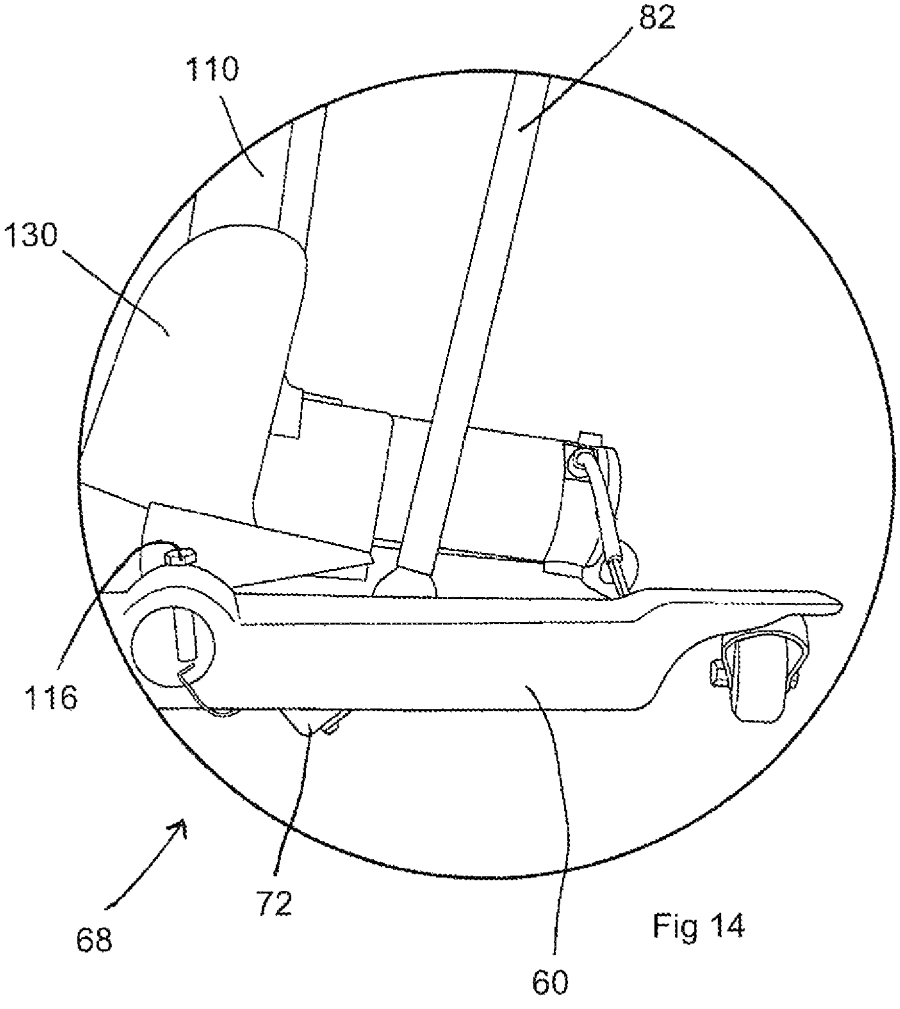
FIG. 14 is an isolation side perspective view of the embodiment of FIG. 1 showing brake components in an intermediate position between the brake position and the no-brake position.
Figure 15:
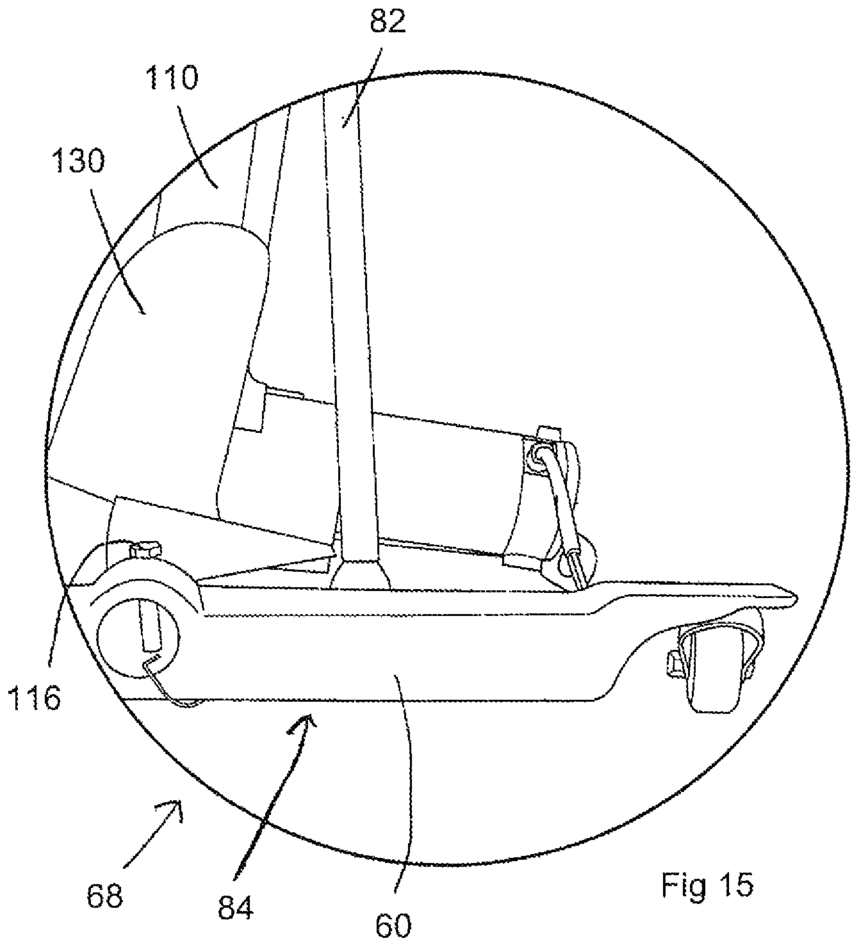
FIG. 15 is an isolation side perspective view of the embodiment of FIG. 1 showing brake components in the no-brake position.
Figure 16:
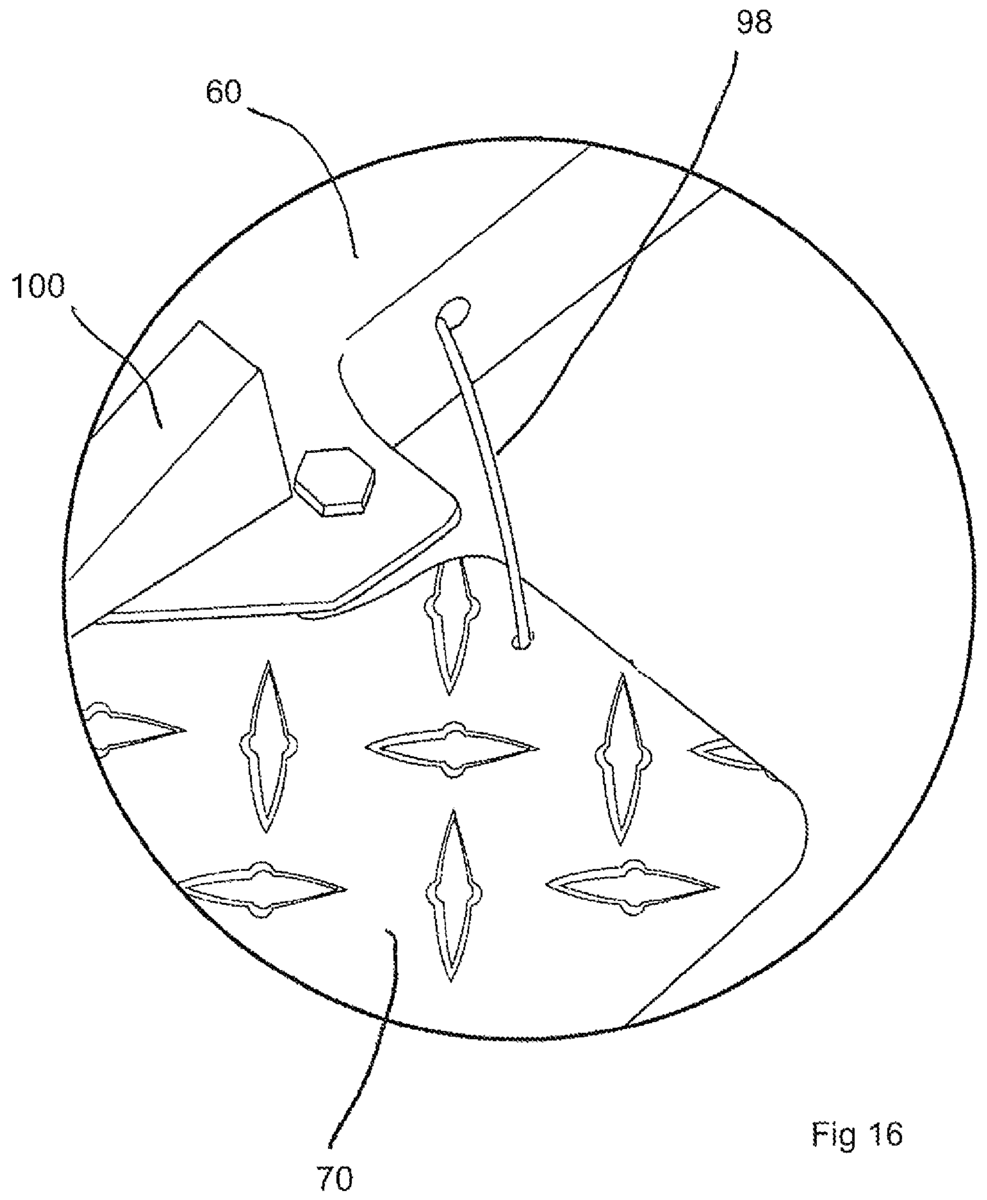
FIG. 16 is an isolation perspective view of the embodiment of FIG. 1 showing footrest components and associated features.

As shown throughout the drawings and in detail in FIG. 11, the drive assembly 55 includes: an electric motor 200, a battery 202, a battery charger 204, a bevel gear box 206, a motor housing 208, a threaded rod 210, a threaded driven element 212, an upper bearing 214, a rod housing 216, a user's control 218 and an attendant's control 220.

The electric motor 200 is drivably connected to the threaded rod 210 via the bevel gear box 206, which supports the proximal end of the threaded rod 210. The distal end of the threaded rod 210 is supported by the upper bearing 214, which is mounted to the cross brace 112.

The threaded driven element 212 is attached to the chair back 140 such that the threaded driven element 212 is not free to rotate. The threaded driven element 212 includes a threaded bore that is threadedly engaged with the threaded rod 210, such that rotation of the threaded rod 210 causes the threaded driven element 212 to move along the length of the threaded rod 210, which causes the seat assembly to move along the length of the frame 54.

The electric motor 200, battery 202 and battery charger 204 are located within the motor housing 208. The bevel gear box 206 is partially located within the motor housing 208. The electric motor 200 is drivably connect to the bevel gear box 206 such that rotational movement of the electric motor 200 is imparted to the bevel gear box 206 and thus to the threaded rod 210. The drive assembly 55 also includes micro-switches (not shown) for stopping the electric motor 200 when the driven element 212 is at the end of useful travel in either direction. Power for the electric motor 200 is provided by the battery 202, which may be charged by plugging the battery charger 204 into a conventional outlet.

As shown in FIG. 11, preferably associated with the bevel gear box 206, there is a bevel gear release 222 for use in moving the gears within the bevel gear box 206 between an in-gear position in which the electric motor 200 is drivably connected to the threaded rod 210 and an out-of-gear position in which the electric motor 200 is not drivably connected to the threaded rod 210. In the event of a failure of the electric motor 200 or the battery 202, the bevel gear release 222 may be manipulated to bring the gears into the out-of-gear position and a hand crank 224 (shown in FIG. 10) may be engaged with the top of the threaded rod 210 to manually rotate the threaded rod 210 so as to raise or lower the seat assembly 56.

The screw-drive arrangement of the described embodiment has the advantages of simplicity, robustness and smooth steady movement. However, it will be apparent that other lifting means, for example rams (hydraulic or air), or cable-pulley assemblies or chain-gear assemblies, could also be used.

The user's control 218 and attendant's control 220 are duplicate means for controlling the electric motor 200. They each have three positions, "up", "stop" and "down", with "stop" being the default position when neither "up" nor "down" is engaged. The attendant's control 220 is positioned so as to be readily accessible to an attendant assisting a user of the wheelchair 50, such as on, or in the vicinity of, the cross brace 112. The user's control 218 is preferably moveable so as to be accessible by the user from various locations and with the wheel chair 50 and its constituent components in the various possible positions. The user's control 218 may be a hand unit connected by a conventional wire harness to the electric motor 200. Alternatively, the user's control may be a wireless device (perhaps configured to be worn by the user, such as on a wrist) that communicates with a suitable receiver connected to the electric motor 200.

As shown throughout the drawings. each wheel assembly 58 includes a wheel arm 230, an axle block 232, an axle plate 234 and a wheel 236.

Each wheel arm 230 is at its proximal/upper end pivotally mounted to an associated spar mount assembly 150. Each axle block 232 is mounted at the distal end of the associated wheel arm 230. Each axle block 232 is associated with an axle plate 234. Each axle plate 234 is attached to the seat assembly 56 and is located in the vicinity of the pivot axis between the chair back 140 and seat 142.

Each axle block 232 has one or more and preferably four block bores 240. Each axle plate 234 has an equal number of associated plate bores 242 in a generally vertically extending array. The wheel arms 230, axle blocks 232 and axle plates 234, are configured such that each axle block 232 may be positioned relative to the associated axle plate 234 so as to bring each block bore 240 into alignment with an associated plate bore 242. Preferably, there is a stop 244 on each side of the seat assembly 56 configured to prevent the associated wheel arm 230 from pivoting forward beyond a desirable position. Preferably, each stop 244 is also configured to engage with each wheel arm 230 so as to impede outward lateral movement of the distal end of the wheel arm 230 when the block bore 240 is in alignment with the associated plate bore 242. Providing impedance to lateral movement at the distal end of each wheel arm 230 permits the wheel arms to be made of lighter material than if such impedance to lateral movement relied solely on the rigidity of the wheel arm 230 and the pivotal connection between the wheel arm 230 and the seat assembly 56. A pin-receptacle combination as between each stop 24 and associated block bore 240 can effectively provide the desired impedance to lateral movement.

Alternatively, each axle plate 234 may contain more than one array of plate bores 242, configured so as to permit fore and aft balancing of the wheelchair 50 when the wheels 236 are bearing weight. This is desirable because of the size of the rollers 64 and castors 66. The rollers 64 are smaller than the secondary wheels on a conventional wheelchair so as to permit a desirable lowering of the seat assembly 56 and to reduce the overall size of the wheelchair 50 when in the collapsed position. Although the small rollers 64 are not problematic when the wheelchair 50 is used on smooth surfaces, when used on less smooth surfaces it is desirable to balance the wheelchair 50 so that the wheels 236 bear essentially all of the weight, such that the rollers 64 and castors 66 merely provide stability (in a manner somewhat analogous to training wheels on a bicycle).

Each wheel 230 is a conventional wheelchair wheel having an inner rim 250 for manual rotation of the wheel 230. Each wheel 230 includes a projecting axle stub 252 suitable for insertion into a block bore 240 and, if aligned, through a block bore 240 into a plate bore 242. The axle stub 252 includes a "quick-release" retention means for preventing the axle stub 252 from undesirably exiting the relevant bore or bores when in use, while permitting manual extraction of the axle stub 252 from the bore or bores with minimal effort when the wheel 230 is not under load. A typical such "quick-release" means would be a partially projecting ball resiliently biased by a spring within the axle stub 252, so as to project laterally at the side of the axle stub 252.

When the wheelchair 50 is used in a manner similar to a conventional manually driven wheelchair, each axle stub 252 is inserted through a block bore 240 and into a plate bore 242, so as to maintain each wheel 236 in a suitable position for frictionally engaging the supporting surface so as to move the wheelchair 50 through manual rotation of the wheels 236. To be clear, it is the insertion of the axle stub 252 into the plate bore 242, that secures the block bore 240 into the desired position for moving the wheelchair 50 by manual rotation of the wheels 236. Partially extracting an axle stub 252, so as to withdraw it from the plate bore 242 while leaving it within the block bore 240, frees the wheel arm 230 to pivot rearward (assuming such pivoting is not constrained by contact between the wheel 236 and the surrounding supporting surface).

In use, the selection of the block bores 240 and plate bores 242 into which the axle stubs 252 are inserted, is made with an eye to providing a suitable height of use for the particular user. When the lower block bores 240 and plate bores 242 are used, the distance between the top of the seat 142 and the top of the footrests 70 when the wheels 236 commence bearing weight, is greater than when the upper block bores 240 and plate bores 242 are used.

In use, switching from using the wheelchair 50 as a conventional wheelchair to using it where the seat 142 is in a lowered position and/or one or the other or both chair sides 144 is in a ramp position 178, involves: raising the seat assembly 56 so as to lift the wheels 236 from the surrounding surface; manually partially extracting the axle stubs 252 so as to permit the wheel arms 230 to pivot; and moving the seat assembly 56 to the desired height. If the movement to the desired height brings the wheels 236 into contact with the surrounding surface the orientation of the wheel arm 230 and relative angle between the base 52 and frame 54 will tend to cause the wheels 236 to roll, and wheel arm 230 to pivot, rearward. Raising the seat assembly 56 will permit the wheels 236 to roll forward and the wheel arm 230 to pivot forward, bringing the axle block 232 back into the vicinity of the axle plate 234, so as to facilitate insertion of the axle stub 252 into the plate bore 242 should such be desired. Thus, for many uses, the wheels 236 essentially automatically move between a location suitable for inserting the axle stubs 252 into the plate bores 242 and an out-of-the-way location to enable use of the chair sides 144 in the ramp position 178. Further, either wheel 236 can be detached from the respective block bore 240 should this be necessary due to space constraints.

The wheelchair 50 may include means for adjusting the angle between the base 52 and the frame 54. For example, it may be desirable in some instances for the frame 54 to have a forward cant relative to the base 52, such that the user will move forward as the seat assembly 56 rises, perhaps to more readily grasp items on shelves. Alternatively, it may be desirable to have a rearward cant so as to obtain a preferred chair back 140 position. The means for adjusting the angle between the base 52 and the frame 54 may consist of arrays of additional pin 116 receiving holes in the pivot strut 62 and pivot mount 114. Alternatively, the means for adjusting the angle between the base 52 and frame 54 may comprise a worm-drive assembly, for example, in which the worm is attached to the frame 54 and the worm gear is attached to the base 52 and is located and configured so as to be concentric with the pivot axis as between the base 52 and frame 54. Such a worm drive could be manually or motor actuated. Preferably, along with such means for adjusting the angle between the base 52 and the frame 54, there will be means for adjusting the relative angle between the chair back 140 and seat 142 when in the seating position 160, and the relative angle between the seat 142 and the calf support 146 when in the calf-support downward position 190, so as to maintain a desirable seating configuration.

A braced-frame wheelchair 300 embodiment of the present invention is shown in FIGS. 19-23. The braced-frame wheelchair base 302, braced-frame wheelchair drive assembly 304, braced-frame wheelchair seat assembly 306 and braced-frame wheelchair wheel assembly 308 are each generally similar to the corresponding features of the above-described embodiments (i.e., the base 52, drive assembly 55, seat assembly 56 and wheel assembly 58), except with respect to some details as outlined below.

The braced-frame 310 includes a spar assembly 312 (essentially corresponding to frame 54 and mounted to the braced-frame wheelchair base 302 in a manner similar to the mounting of the frame 54 to the base 52) and two telescoping braces 314 extending in use between the upper end of the spar assembly 312 and the vicinity of the rearward end of the braced-frame wheelchair base 302.

The telescoping braces 314 permit the spar assembly 312 to be made of lighter material than the frame 54 in that the telescoping braces 314 provide both fore-and-aft support to the spar assembly 312, and due to the lateral displacement of the upper end of the telescoping braces 314 as compared to the lower end of the telescoping braces 314, lateral support to the spar assembly 312.

Further, the telescoping braces 314 reduce or eliminate the torque at the junction of the spar assembly 312 and braced-frame wheelchair base 302, thus permitting the device for securing the spar assembly 312 and braced-frame wheelchair base 302 relative to one another in an operable position (i.e., a pin or bolt) to be less robust than the corresponding component in wheelchair 50. As well, each telescoping brace 314 is comprised of a brace tube 316 with a longitudinally extending internal bore and a mating peg 318 so as to permit telescoping of the telescoping braces 314. As indicated in the drawings, each brace tube 316 has a single transverse pin-bore 319 and each peg 318 has multiple cooperating pin-bores 319, wherein the length of the telescoping braces 314 can be adjusted so as to alter the angle at which the spar assembly 312 meets the braced-frame wheelchair base 302 and thus the general in-use cant of the spar assembly 312 and the braced-frame wheelchair seat assembly 306.

Mounted to the spar assembly 312, there are two cam rollers 320 which rotate on contact with a respective footrest cam 130 so as to reduce friction and provide a smoother camming action as compared to the wheelchair 50.

Mounted to the spar assembly 312, there is a top-of-travel sensor 322 that senses when the braced-frame wheelchair seat assembly 306 has reached the limit of desirable upward travel and a bottom-of-travel sensor 324 that senses when the braced-frame wheelchair seat assembly 306 has reached the limit of desirable downward travel. The top-of-travel sensor 322 and bottom-of-travel sensor 324 are interconnected with the controls for the braced-frame wheelchair drive assembly 304 such that rotation of the threaded rod 210 ceases once a limit of desired travel is reached. The top-of-travel sensor 322 and bottom-of-travel sensor 324 are pressure switches that contact components of the braced-frame wheelchair seat assembly 306 at the respective limit of desired travel. Other devices for preventing travel beyond desired limits could also be used, for example, a device for tracking rotation of the threaded rod 210.

Figure 19:
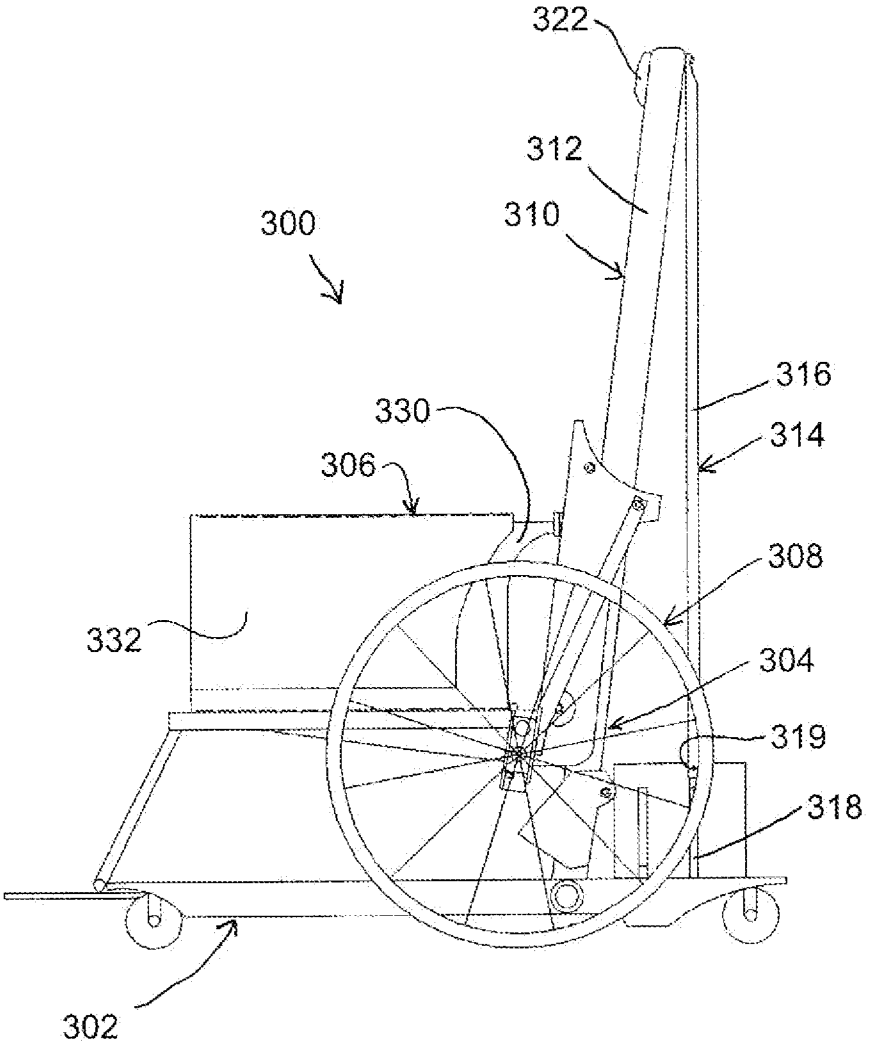
FIG. 19 is side elevation view of another wheelchair embodiment of the present invention shown in position for manually driven movement.
Figure 20:
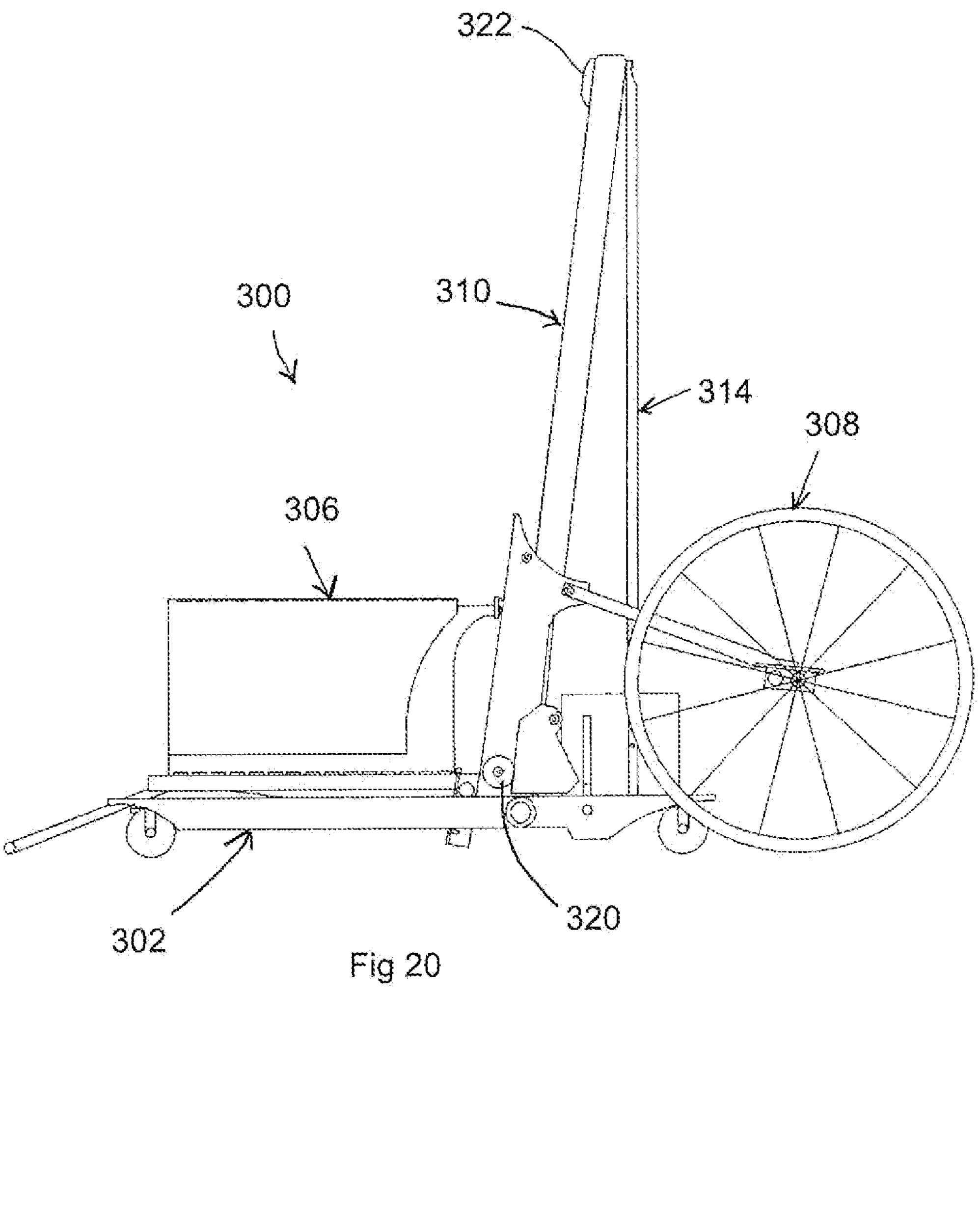
FIG. 20 is a side elevation view of the embodiment of FIG. 19 shown with a lowered seat.
Figure 21:
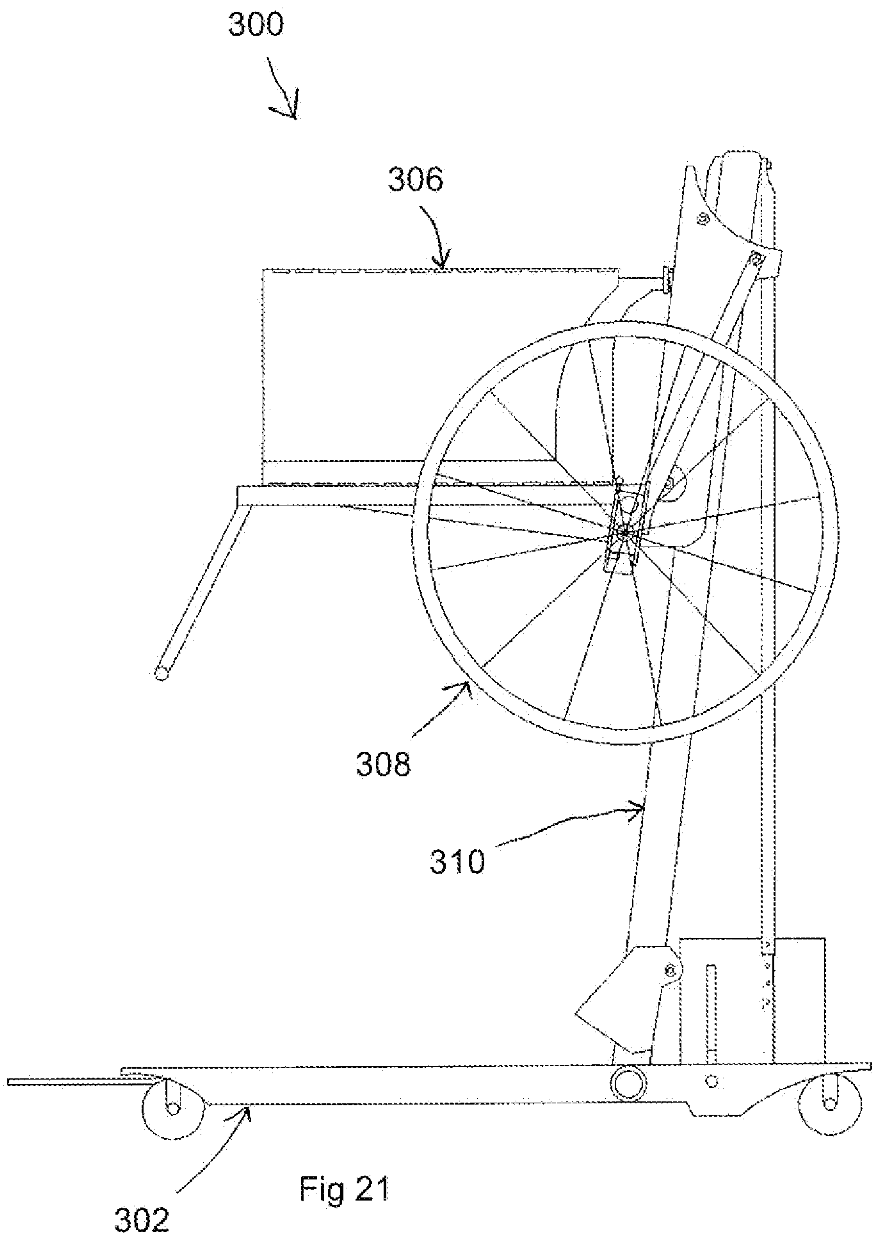
FIG. 21 is a side elevation view of the embodiment of FIG. 19 shown with a raised seat.
Figure 22:
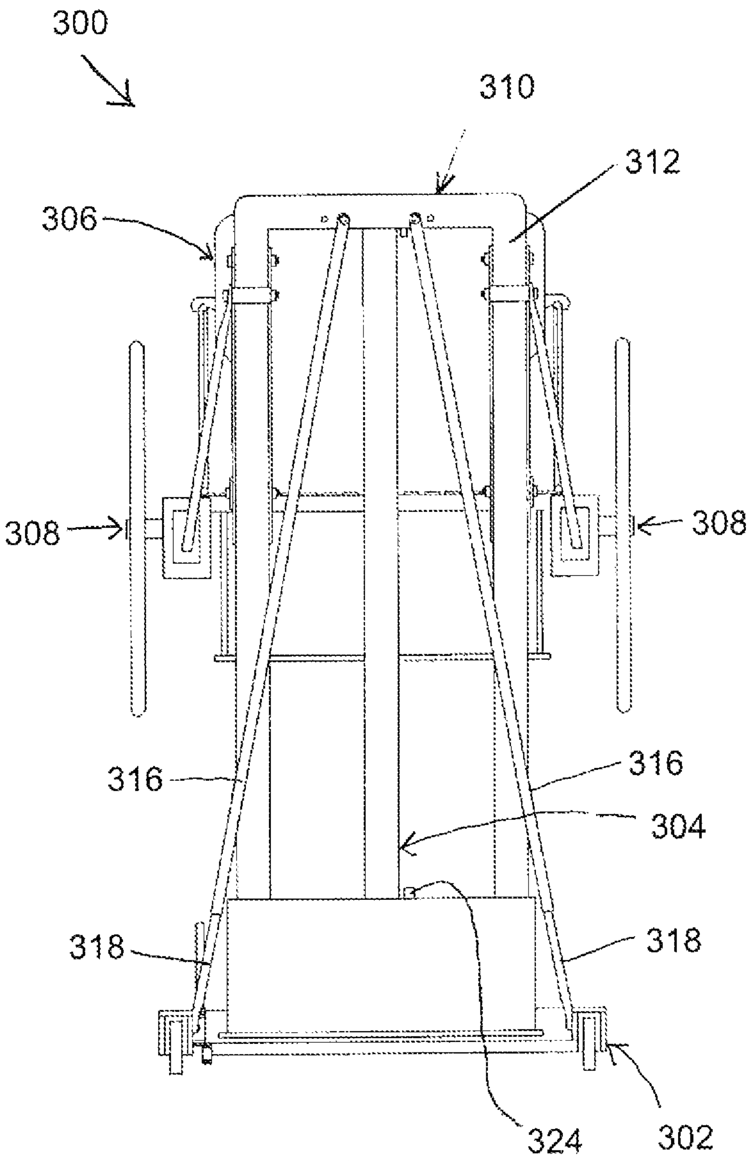
FIG. 22 is a rear elevation view of the embodiment of FIG. 19 shown with a raised seat.

As shown in FIGS. 19 to 21, as compared to the chair sides 144 of wheelchair 50, the braced-frame inner plate 330 and braced-frame outer plate 332 have cutaways, such that the distal portion of the braced-frame outer plate 332 is narrower than the distal end of the outer plate 172. This configuration of the braced-frame inner plate 330 and braced-frame outer plate 332 facilitates user movement as between the braced-frame wheelchair 300 seat and adjacent surfaces with constrained surrounding space, such as vehicle seats.

Figure 23:
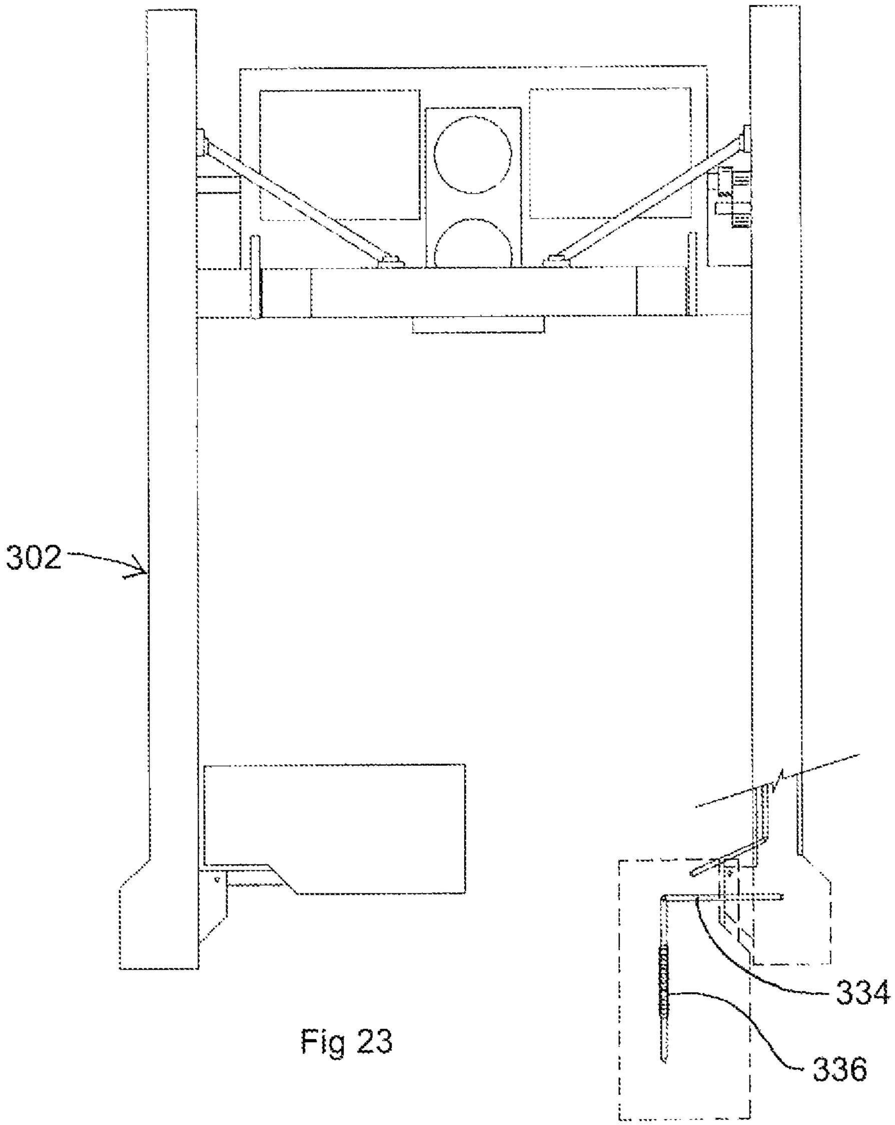
FIG. 23 is a top plan partially transparent view of the embodiment of FIG. 19 illustrating footrest features and shown without the seat assembly.

As indicated in FIG. 23, the braced-frame bias cable 334 and braced-frame bias spring 336 are disposed on the underside of each braced-frame footrest 338.

A push-chair 350 embodiment of the present invention is shown in FIGS. 24-28. The push-chair 350 is not configured for self-mobility by a person seated in the push-chair 350, but the push-chair 350 may be pushed by a second person.

The push-chair 350 includes a push-chair base 352, push-chair frame 354 (akin to the braced-frame 310), push-chair drive assembly 356 (akin to the drive assembly 55 and braced-frame wheelchair drive assembly 304), and push-chair seat assembly 358.

The push-chair seat assembly 358 is generally similar to the braced-frame wheelchair seat assembly 306 except with respect to the following details. The push-chair seat assembly 358 includes a headrest 360 configured for up and down adjustment. The push-chair seat assembly 358 also includes a seat extender 362, being a seat panel 364 pivotably attached to the forward edge of the push-chair seat 366 and pivotable between an underslung position in which it is under the push-chair seat 366 and an extender position (in which latter position it is releasably retained by sliding members attached to the push-chair seat 366 (not shown)).

The push-chair base 352 differs from the base 52 in that the push-chair rollers 370 and push-chair castors 372 are of a larger diameter than the rollers 64 and castors 66, to facilitate pushing of the push-chair 350 over uneven surfaces. To accommodate the push-chair rollers 370 and push-chair castors 372, rearward and forward portions of the push-chair base 352 are displaced upwards.

The push-chair footrests 376 are connected to the push-chair base 352 so as to be manually pivoted upwards if it is desirable to move them from their user-foot supporting position. For desired cooperation with the seat extender 362, the push-chair footrests 376 preferably are similarly extendible (not shown). Preferably, each push-chair footrest 376 comprises a bottom leaf and an upper leaf pivotably attached to the bottom leaf at the distal end of the bottom leaf, wherein the push-chair footrest 376 may be extended by pivoting the upper leaf from a position in which it overlies the bottom leaf to a position in which the upper leaf extends forward from the bottom leaf.

An electric wheelchair 400 embodiment of the present invention is represented in FIGS. 29 to 32. The electric wheelchair 400 includes the electric-chair base 402, electric-chair frame 404 (generally akin to the push-chair frame 354), electric-chair drive assembly 406 (generally akin to the drive assembly 55, braced-frame wheelchair drive assembly 304 and push-chair drive assembly 356), electric-chair seat assembly 408 and electric-chair wheel assembly 410.

Figure 29:
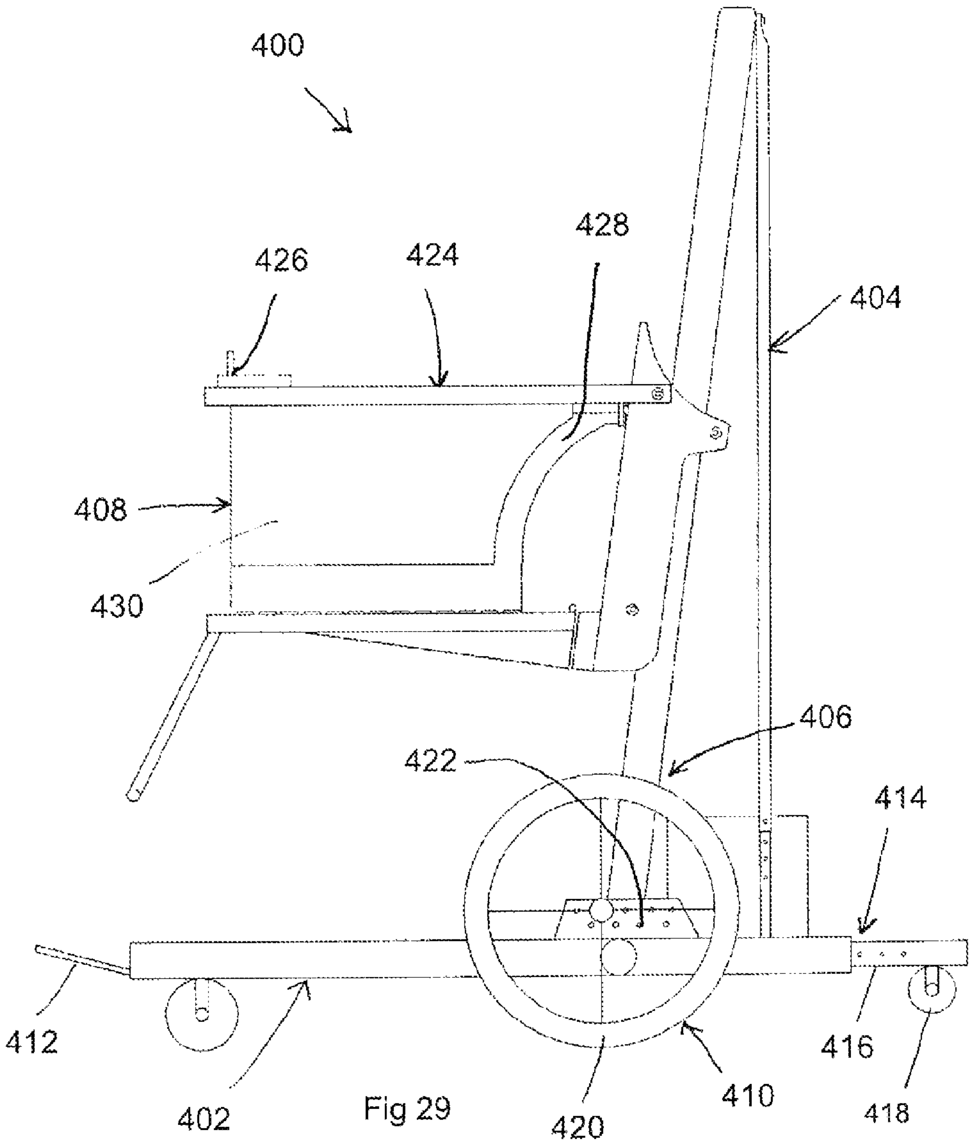
FIG. 29 is a side elevation view of an electric wheelchair embodiment of the present invention.
Figure 30:
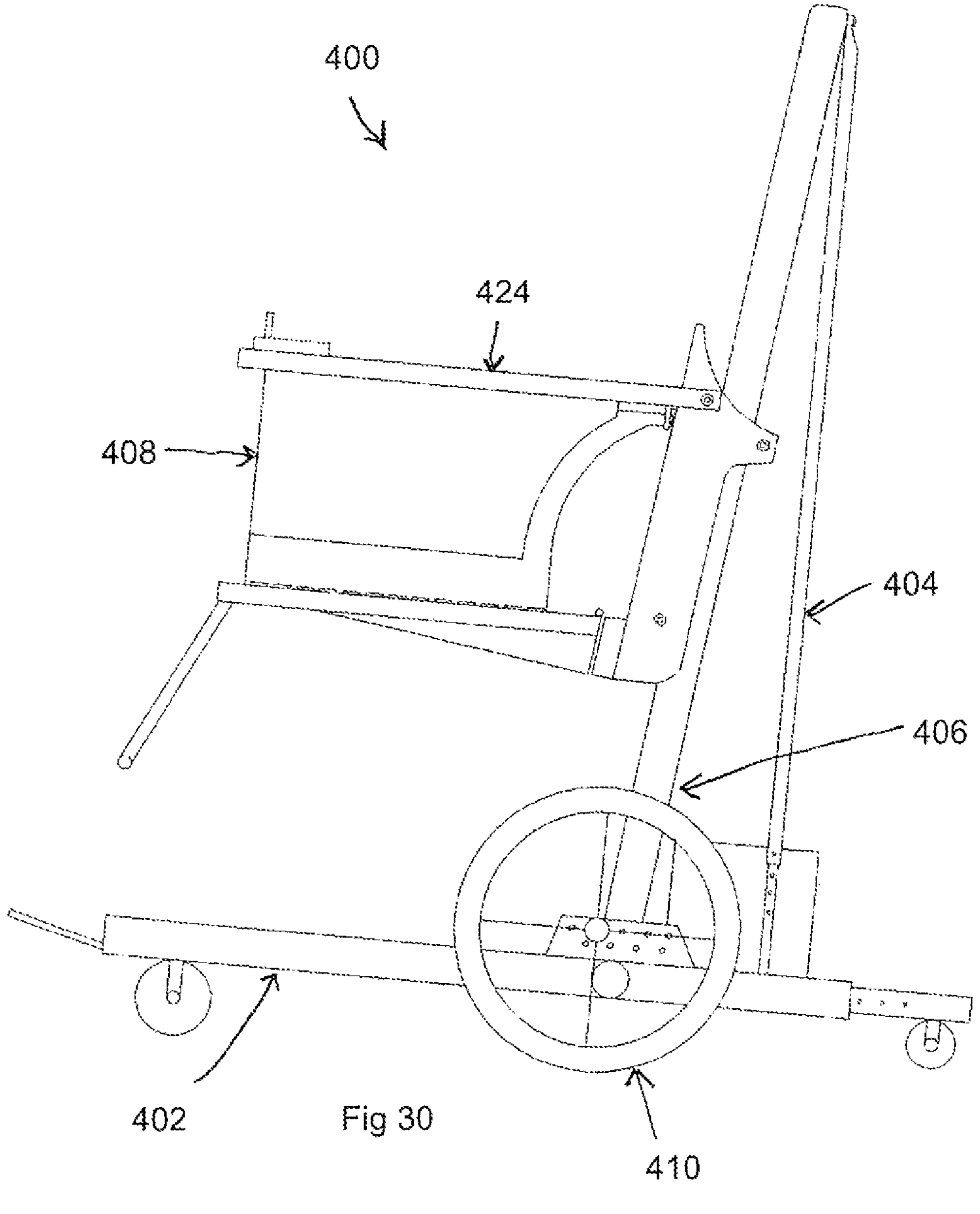
FIG. 30 is a side elevation view of the embodiment of FIG. 29 shown tilted rearward.
Figure 31:
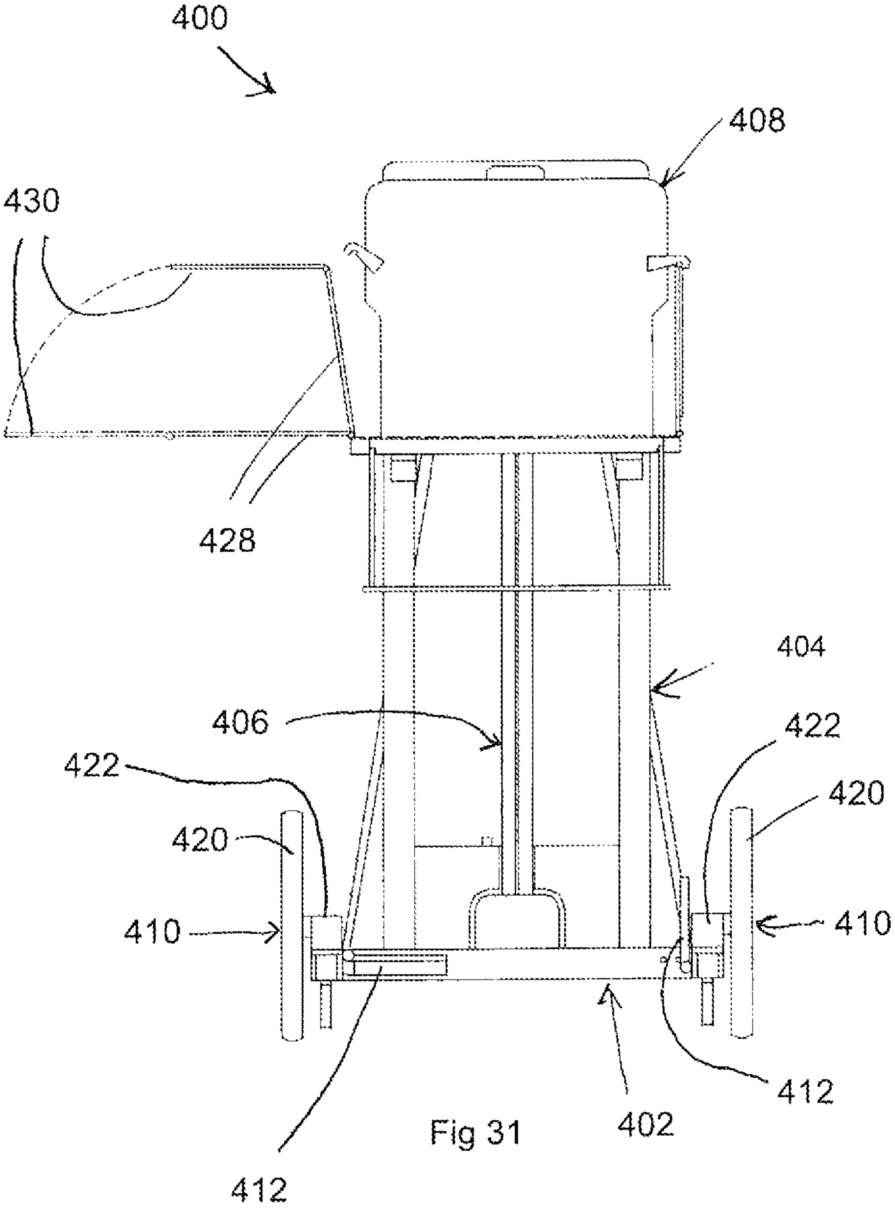
FIG. 31 is a front elevation view of the embodiment of FIG. 29 shown with a raised seat and illustrating the deployment of a chair side.
Figure 32:
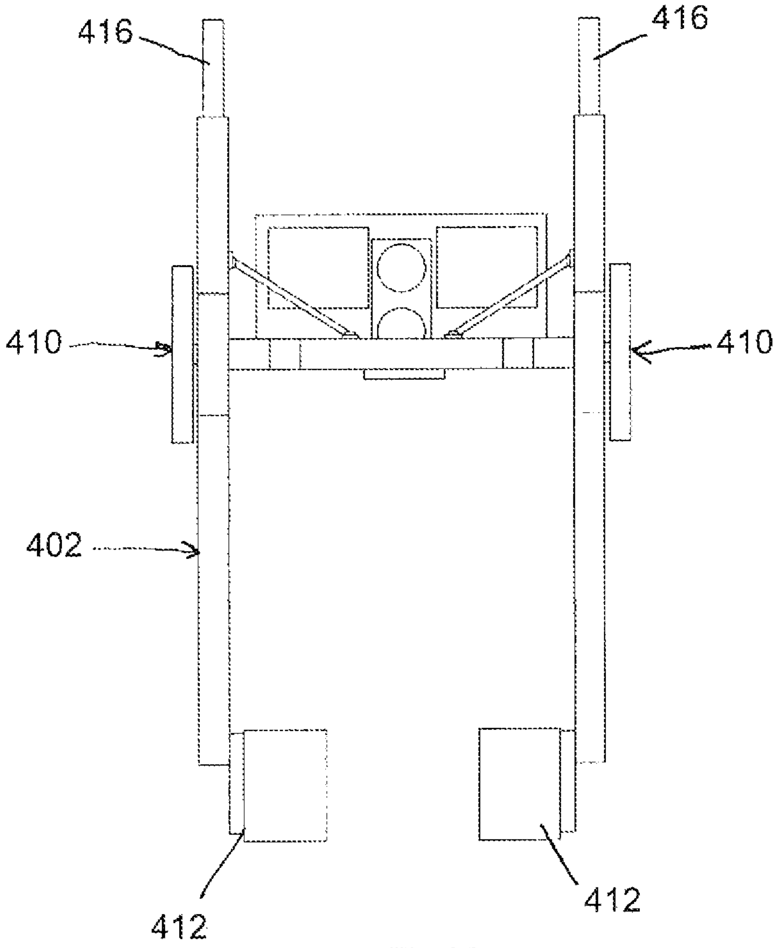
FIG. 32 is a top plan view of the embodiment of FIG. 29, shown without the seat assembly.

The electric-chair base 402 includes electric-chair footrests 412 akin to the push-chair footrests 376. The electric-chair base 402 includes two rearward projecting adjustable stabilizer assemblies 414. Each stabilizer assembly 414 includes a stabilizer bar 416 telescopically engaging the balance of the electric-chair base 402 and in the vicinity of the rearward end of the stabilizer bar 416, a stabilizer wheel 418. As indicated in FIGS. 29 and 30, the stabilizer assemblies are configured such that the stabilizer wheels 418 do not contact the supporting surface when the electric wheelchair 400 is level on a level surface, but the stabilizer wheels 418 do contact the supporting surface when the electric wheelchair is tipped rearward (such as if the supporting surface is not level or is uneven) so as to impede further rearward tipping of the electric wheelchair 400.

The electric-chair wheel assembly 410 includes two electric wheels 420, two electric-wheel mounts 422 and a control arm 424.

To better show the electric-wheel mounts 422, the electric wheels 420 are shown in a stylized manner with four "spokes". However, the electric wheels 420 are integral-motor wheelchair wheels in that an electric motor (not shown) that drives each electric wheel 420 is located within each electric wheel 420.

The electric-wheel mounts 422 are attached to the electric-chair base 402. Each electric-wheel mount 422 provides a plurality of mounting positions such that the position of each electric-wheel 420 may be adjusted both fore and aft, and up and down relative to the electric-chair base 402.

The control arm 424 is pivotably mounted to the electric-chair seat assembly 408. The control arm 424 has at its distal end a joystick 426 (or other conventional electric wheelchair control) for controlling the electric-wheel 420. The control arm 424 may be pivoted between an operable position in which the joystick 426 may be readily manipulated by the user and an out-of-the-way position (in which the control arm 424 may be essentially aligned with the electric-chair frame 404) so as not to interfere with lateral movement by the user from the electric-chair seat assembly 408 to a surface adjacent the side of the electric wheelchair 400 on which the control arm 424 is located.

The electric-chair seat assembly 408 is generally similar to the braced-frame wheelchair seat assembly 306 except that the cutaways in the electric-chair inner plates 428 and electric-chair outer plates 430 are configured to clear the electric wheels 420 when unfolded with the electric-chair seat assembly 408 lowered.

The chairs described herein may be sized as required by the user, including that the relative proportions of the various chair components may be varied as required for users of different relative proportions. For example, the seats may be made relatively wider than shown to accommodate individuals of large girth.

The advantages of the invention described herein may be obtained with alternative seat lifting means, for example, scissor lifts, hydraulic lifts etc., may be suitable.

What is claimed is:

1. An adjustable chair for a user with reduced mobility, the chair suitable for movement of the user between the chair and an adjacent surface, the chair comprising:

a base;

a longitudinally extending frame pivotably attached to the base, wherein the frame and base may be pivoted relative to one another between one or more in-use positions in which the frame projects from the base and a storage position in which the frame generally overlies the base;

a seat assembly comprising:

a seat surface; and two opposed chair sides, at least one of the chair sides comprising:

an inner chair side member having a proximal edge pivotably mounted adjacent the seat surface and a distal edge; and an outer chair side member having a proximal edge pivotably connected to the inner chair side member distal edge, wherein the at least one of the chair sides is reversibly movable relative to the seat surface between an upper position in which the inner and outer chair side members are in a folded side-by-side configuration and impede lateral movement of a user seated on the seat surface, and a lowered bridging position in which the inner and outer chair side members are in an extended unfolded configuration so as to provide support to a user moving between the seat surface and an adjacent surface; and a lift mechanism configured for selectively reversibly moving the seat assembly along the longitudinal extent of the frame when the frame is in an in-use position, so as to move the seat assembly toward and away from the base;

whereby, a user may use the lift mechanism and chair side to selectively facilitate lateral movement of the user between the seat surface and a surface on which the base is resting and between the seat surface and a surface higher than the surface on which the base is resting.

2. The chair of claim 1, wherein the pivotable connection between the inner chair side member and the outer chair side member is configured to impede relative pivotal movement as between the inner chair side member and the outer chair side member beyond about 180 degrees from the folded side-by-side configuration, whereby in the extended unfolded configuration, the inner chair side member and the outer chair side member together function as a generally planar bridging span.

3. The chair of claim 1, wherein the seat assembly further comprises a calf support reversibly pivotable relative to the seat surface between a downward position and a projecting position, wherein, moving the seat assembly toward the base brings the calf support into contact with the base causing the calf support to move toward the projecting position.

4. The chair of claim 1, wherein the base comprises two footrests, wherein each footrest reversibly moves from a foot-supporting position to a non-projecting; position responsive to movement of the seat assembly toward the base.

5. The chair of claim 4, wherein the chair comprises: two springs, each spring connected to a respective footrest so as to bias the footrest toward the foot-supporting position; and a cam assembly connected to the footrests and configured to contact the seat assembly as it moves toward the base and pivot responsive to such contact and draw the footrests toward the non-projecting position.

6. The chair of claim 1, wherein:

the frame comprises two spars, spaced apart one from the other in a generally parallel relationship;

the lift mechanism comprises a drive column interposed between the two spars; and the seat assembly comprises:

two spar mount assemblies, slidably mounting the seat assembly to each of the spars so as to permit movement of the seat assembly along the length of the spars; and a drive engager connecting the seat assembly to the drive column.

7. The chair of claim 6, wherein the drive column comprises a rotatable threaded rod and the drive engager comprises a rotationally fixed threaded member threadedly mated with the rod whereby rotation of the threaded rod causes the drive engager to move along the length of the rod.

8. The chair of claim 7, wherein the threaded rod is drivably connected to an electric motor.

9. The chair of claim 7, wherein the threaded rod is configured for manual rotation.

10. The chair of claim 1, wherein the chair comprises securing assemblies for selectively releasably securing the frame and base in the in-use positions.

11. The chair of claim 10, wherein the securing assemblies comprise at least one adjustable brace extending between the frame and base.

12. The chair of claim 1, further comprising:

two caster wheels mounted in the vicinity of a forward end of the base; and a drive wheel assembly, comprising:

two wheel arms, each having a proximal end and a distal end, and each pivotally mounted to the seat assembly at the proximal end; and two manually operable wheelchair wheels, each mounted to the distal end of a respective wheel arm; and the chair comprises a forward lock assembly for releasably securing the wheelchair wheels in one or more forward positions for manual drive operation;

wherein, when released from the one or more forward positions for manual drive operation, the wheel arms are free to pivot rearward responsive to contact between the wheelchair wheels and an adjacent surface as the seat assembly is moved toward the base.

13. The chair of claim 12, wherein each wheelchair wheel comprises a projecting axle stub;

each wheel arm comprises at its distal end an axle block, each axle block having one or more through-bores configured to releasably receive an axle stub;

the seat assembly further comprises two axle plates, each axle plate operably associated with a respective on of the axle blocks and each axle plate having one or more receptacles configured to releasably receive an axle stub;

wherein the forward lock assembly comprises the axle stubs, axle blocks and axle plates, in that each axle block and the associated axle plate are configured such that the axle stub of one of the wheelchair wheels may be inserted through the axle block into the axle plate with the wheelchair wheel in one of the one or more forward positions.

14. The chair of claim 12, further comprising two secondary support wheels mounted in the vicinity of a rearward end of the base and a brake assembly for frictionally engaging a surface below the base.

15. The chair of claim 14, wherein the brake assembly comprises a manually operable brake cam having a friction-inducing braking material.

16. The chair claim 1, further comprising two caster wheels mounted in the vicinity of a forward end of the base and a drive wheel assembly, wherein the drive wheel assembly comprises two electrically driven wheels mounted to the base.

17. The chair of claim 16, wherein each electrically driven wheel comprises an integral motor and the base comprises two electric wheel mounts having a plurality of mounting positions.

18. The chair of claim 16, further comprising two stabilizer wheels adjustably mounted in the vicinity of a rearward end of the base, wherein the stabilizer wheels may be selectively moved in a rearward-forward direction and releasably secured in a position providing a desired impediment to rearward tipping of the chair.

19. The chair of claim 1, wherein the seat assembly further comprises a seat surface extender pivotally mounted in the vicinity of a forward edge of the seat surface and pivotal between an underslung position and a projecting position.

* * * * *